United States Patent
Takagi et al.

(10) Patent No.: US 9,927,023 B2
(45) Date of Patent: Mar. 27, 2018

(54) HYDRAULIC CONTROL DEVICE

(71) Applicant: DENSO CORPORATION, Kariya, Aichi-pref. (JP)

(72) Inventors: Akira Takagi, Kariya (JP); Hiroshi Tanimura, Kariya (JP); Hajime Yokohama, Kariya (JP); Hirohisa Noda, Kariya (JP)

(73) Assignee: DENSO CORPORATION, Kariya (JP)

( * ) Notice: Subject to any disclaimer, the term of this patent is extended or adjusted under 35 U.S.C. 154(b) by 50 days.

(21) Appl. No.: 15/044,540

(22) Filed: Feb. 16, 2016

(65) Prior Publication Data

US 2016/0245397 A1     Aug. 25, 2016

(30) Foreign Application Priority Data

Feb. 23, 2015 (JP) .................................... 2015-33270
Apr. 9, 2015 (JP) .................................... 2015-79689

(51) Int. Cl.
*F16H 61/02* (2006.01)
*F16H 61/00* (2006.01)

(52) U.S. Cl.
CPC ..... *F16H 61/0206* (2013.01); *F16H 61/0021* (2013.01); *F16H 61/0251* (2013.01); *F16H 2061/0253* (2013.01)

(58) Field of Classification Search
CPC ............. F16H 61/0206; F16H 61/0021; F16H 61/0251; F16H 2061/0209; F16H 2061/0253
See application file for complete search history.

(56) References Cited

U.S. PATENT DOCUMENTS

| | | | | |
|---|---|---|---|---|
| 6,102,826 A | * | 8/2000 | Takahashi | F16H 61/12 475/119 |
| 6,299,560 B1 | * | 10/2001 | Fujioka | F16H 61/0206 475/119 |
| 6,432,015 B1 | * | 8/2002 | Takahashi | F16H 61/0206 475/116 |
| 6,780,131 B2 | * | 8/2004 | Itou | F16H 61/0206 475/119 |

(Continued)

FOREIGN PATENT DOCUMENTS

JP     2007-139181     6/2007

*Primary Examiner* — Ramya P Burgess
*Assistant Examiner* — David R Morris
(74) *Attorney, Agent, or Firm* — Nixon & Vanderhye P.C.

(57) ABSTRACT

A first-type passage switching valve is in an oil supply line connecting a friction element to an N/H type pressure control valve and a second-type passage switching valve is in another oil supply line connecting another friction element to an N/L type pressure control valve. A working-pressure output valve outputs a hydraulic working pressure to each of the first-type and the second-type passage switching valves. The first-type passage switching valve changes communication condition from a first state connecting the friction element and the pressure control valve with each other to a second state connecting the friction element and a drain side with each other, or vice versa. The second-type passage switching valve changes communication condition from a first state connecting the friction element and the pressure control valve with each other to a third state connecting the friction element and a hydraulic pressure source with each other, or vice versa.

26 Claims, 11 Drawing Sheets

(56) References Cited

U.S. PATENT DOCUMENTS

| | | | |
|---|---|---|---|
| 8,403,793 B2 * | 3/2013 | Moorman | F16H 61/0031 475/116 |
| 9,051,856 B2 * | 6/2015 | Takagi | F16H 57/0404 |
| 2001/0022199 A1 * | 9/2001 | Tokunaga | F15B 13/0835 137/883 |
| 2001/0036878 A1 * | 11/2001 | Itou | F16H 61/0206 475/116 |
| 2002/0035001 A1 * | 3/2002 | Takahashi | F16H 61/0206 475/131 |
| 2010/0081545 A1 | 4/2010 | Shimizu et al. | |
| 2011/0197982 A1 * | 8/2011 | Moorman | F16H 61/0031 137/565.11 |
| 2013/0192929 A1 * | 8/2013 | Takagi | F16H 57/0404 184/6.24 |

* cited by examiner

FIG. 3A

| SHIFT RANGE / FRICTION ELEMENT | | C1 | B1 | C2 | B2 | C3 |
|---|---|---|---|---|---|---|
| D-RANGE | 1st GEAR POSITION | ○ | | | | |
| | 2nd GEAR POSITION | ○ | ○ | | | |
| | 3rd GEAR POSITION | ○ | | ○ | | |
| | 4th GEAR POSITION | | ○ | ○ | | |
| L-RANGE | | ○ | | | ○ | |
| R-RANGE | | | | | ○ | ○ |

NOTES: ○ = ENGAGED CONDITION
BLANK = DIS-ENGAGED CONDITION

FIG. 3B

| PRESSURE CONTROL VALVE | VALVE TYPE |
|---|---|
| 8C1 | N/H TYPE |
| 8B1 | N/L TYPE |
| 8C2 | N/H TYPE |
| 8B2 | N/L TYPE |
| 8C3 | N/H TYPE |

FIG. 10

| | STEADY STATE 3rd GEAR | PRE-PROCESSING | TRANSIENT 3rd TO 4th GEAR | POST-PROCESSING | STEADY STATE 4th GEAR |
|---|---|---|---|---|---|
| HYDRAULIC WORKING PRESSURE AT OUTPUT VALVE 25 | Hi | Hi → Lo | Lo | Lo → Hi | Hi |
| CLUTCH PRESSURE AT FRICTION ELEMENT B1 (DIS-ENGAGED ← ENGAGED) | Lo | Lo | Lo → Hi | Hi | Hi |
| HYDRAULIC CONTROL PRESSURE AT CONTROL VALVE 8B1 | Lo | Lo | Lo → Hi | Hi → Lo | Lo |
| PASSAGE SWITCHING VALVE 24L — FIRST COMMUNICATION | YES | YES | YES | NO | NO |
| PASSAGE SWITCHING VALVE 24L — THIRD COMMUNICATION | NO | NO | NO | YES | YES |
| CLUTCH PRESSURE AT FRICTION ELEMENT C1 (ENGAGED ← DIS-ENGAGED) | Hi | Hi | Hi → Lo | Lo | Lo |
| HYDRAULIC CONTROL PRESSURE AT CONTROL VALVE 8C1 | Hi | Hi | Hi → Lo | Lo → Hi | Hi |
| PASSAGE SWITCHING VALVE 24H — FIRST COMMUNICATION | YES | YES | YES | YES → NO | NO |
| PASSAGE SWITCHING VALVE 24H — SECOND COMMUNICATION | NO | NO | NO | NO → YES | YES |

FIG. 11

| | | | STEADY STATE 4th GEAR | PRE-PROCESSING | | TRANSIENT 4th TO 3rd GEAR | POST-PROCESSING | STEADY STATE 3rd GEAR |
|---|---|---|---|---|---|---|---|---|
| ENGAGED ← DIS-ENGAGED | HYDRAULIC WORKING PRESSURE AT OUTPUT VALVE 25 | | Hi | Hi | Hi → Lo | Lo | Lo → Hi | Hi |
| | CLUTCH PRESSURE AT FRICTION ELEMENT C1 | | Lo | Lo | Lo | Lo → Hi | Hi | Hi |
| | HYDRAULIC CONTROL PRESSURE AT CONTROL VALVE 8C1 | | Hi | Hi → Lo | Lo | Lo → Hi | Hi | Hi |
| | PASSAGE SWITCHING VALVE 24H | FIRST COMMUNICATION | NO | NO | NO → YES | YES | YES | YES |
| | | SECOND COMMUNICATION | YES | YES | YES → NO | NO | NO | NO |
| DIS-ENGAGED ← ENGAGED | CLUTCH PRESSURE AT FRICTION ELEMENT B1 | | Hi | Hi | Hi | Hi → Lo | Lo | Lo |
| | HYDRAULIC CONTROL PRESSURE AT CONTROL VALVE 8B1 | | Lo | Lo → Hi | Hi | Hi → Lo | Lo | Lo |
| | PASSAGE SWITCHING VALVE 24L | FIRST COMMUNICATION | NO | NO | NO → YES | YES | YES | YES |
| | | THIRD COMMUNICATION | YES | YES | YES → NO | NO | NO | NO |

HYDRAULIC CONTROL DEVICE

CROSS REFERENCE TO RELATED APPLICATION

This application is based on Japanese Patent Applications No. 2015-33270 filed on Feb. 23, 2015 and No. 2015-79689 filed on Apr. 9, 2015, the disclosures of which are incorporated herein by reference.

FIELD OF TECHNOLOGY

The present disclosure relates to a hydraulic control device for controlling hydraulic pressure to be supplied to each of friction elements of an automatic transmission apparatus mounted in a vehicle.

BACKGROUND

In recent years, a requirement for decreasing electric power consumption is increased for the above hydraulic control device, in order to make a contribution to decrease a fuel consumption ratio of the vehicle. The present disclosure focused on the electric power consumption in a hydraulic-pressure control unit among the electric power consumption of the hydraulic control device.

The hydraulic-pressure control unit has a solenoid and a valve portion, wherein the solenoid is electrically controlled in accordance with a command value for a hydraulic control pressure and an opening degree of the valve portion is adjusted by an electric power supply amount to the solenoid. The hydraulic-pressure control unit, which is provided for each of the friction elements, adjusts a hydraulic pressure produced at a hydraulic-pressure producing unit in order to supply such adjusted hydraulic pressure to the friction element as the hydraulic control pressure.

When a gear-change demand is generated, friction plates of the respective friction elements related to such a gear change are engaged with each other or dis-engaged from each other. Therefore, the command value for the hydraulic control pressure is changed with time for each of the hydraulic-pressure control units related to the gear change. Namely, an electric power supply amount to the solenoid of the hydraulic-pressure control unit is changed with time in order to adjust the hydraulic control pressure. Thus, the electric power is consumed. In each of the friction elements, a coupling condition of the friction plates is changed from an engaged condition to a dis-engaged condition, or vice versa, through a transient state between the engaged and dis-engaged conditions.

When the vehicle runs at a constant speed, for example, at a high speed, the gear-change demand is not generated, so that the engaged condition and the dis-engaged condition of the respective friction elements are maintained. However, the electric power is consumed in each of the solenoids of the hydraulic-pressure control units, even when each of the friction elements is in its steady state, in which the engaged-condition or the dis-engaged condition for the friction plates is maintained.

Each of the hydraulic-pressure control units is composed of either a normally low-pressure type valve (an N/L type valve) which outputs a low pressure when no electric power is supplied to the solenoid of the hydraulic-pressure control unit or a normally high-pressure type valve (an N/H type valve) which outputs a high pressure when no electric power is supplied to the solenoid of the hydraulic-pressure control unit.

In a case that the hydraulic-pressure control unit is composed of the N/L type valve, it is necessary to maintain the electric power supply to the solenoid in order to keep the opening degree of the valve portion at a high-pressure side, when the engaged condition of the friction element connected to the hydraulic-pressure control unit of the N/L type is maintained. Therefore, the electric power is continuously consumed.

On the other hand, in a case that the hydraulic-pressure control unit is composed of the N/H type valve, it is necessary to maintain the electric power supply to the solenoid in order to keep the opening degree of the valve portion at a low-pressure side, when the dis-engaged condition of the friction element connected to the hydraulic-pressure control unit of the N/H type is maintained. Therefore, the electric power is likewise consumed.

The inventors of the present disclosure have conducted the study of reducing the electric power consumption, which is generated in the hydraulic-pressure control unit even when the friction elements are in the steady state.

Japanese Patent Publication No. 2010-084855 (hereinafter, a first prior art) discloses a hydraulic control device for an automatic transmission apparatus, according to which all of hydraulic-pressure control units are composed of N/L type valves in order to reduce electric power consumption in a specific steady state of friction elements. Another Japanese Patent Publication No. 2007-139181 (hereinafter, a second prior art) also discloses a hydraulic control device for the automatic transmission apparatus, according to which a hydraulic passage is provided for introducing hydraulic pressure into an axial end portion of a valve member of a hydraulic-pressure control unit and an ON-OFF operation of the hydraulic passage is controlled separately from a solenoid of the hydraulic-pressure control unit. A valve portion of the second prior art is maintained at its high-pressure side or its low-pressure side, without supplying electric power to the solenoid, so that the electric power consumption is not generated in the solenoid.

However, according to a structure of the above first or the second prior art, it is possible to avoid the generation of the electric power consumption in the solenoid, only when the valve portion is maintained either at the high-pressure side or at the low-pressure side. Therefore, the electric power consumption is unavoidable when the valve portion is maintained at the other side of the high-pressure side or the low-pressure side.

Accordingly, the structure of the above first and the second prior arts is not sufficient to satisfy an object, which the present inventors have aimed at, that is, the object to reduce the electric power consumption generated in the hydraulic-pressure control units when the friction elements are in the steady state.

SUMMARY OF THE DISCLOSURE

The present disclosure is made in view of the above problem. It is an object of the present disclosure to provide a hydraulic control device for an automatic transmission apparatus of a vehicle, according to which it is possible to reduce electric power consumption which is generated in a hydraulic-pressure control unit when friction elements of the automatic transmission apparatus are in a steady state.

According to one of features of the present disclosure, a hydraulic control device controls a hydraulic pressure of working oil to be supplied to each of friction elements, which are components of an automatic transmission apparatus mounted in a vehicle. The hydraulic control device adjusts the hydraulic pressure at a value between a line pressure of the working oil outputted from a hydraulic-pressure producing unit and a drain pressure of the working oil of a drain side. The hydraulic control device outputs an adjusted hydraulic pressure as a hydraulic control pressure to the respective friction elements. The hydraulic control device has multiple hydraulic-pressure control units of an N/H type (a normally high-pressure type), oil supply lines, passage switching units of a first type, a hydraulic-pressure output unit, and so on.

The hydraulic-pressure control unit (the N/H type), which is provided for each of the friction elements, is electrically controlled in accordance with a command value for the hydraulic control pressure, so that the hydraulic pressure is adjusted at the value between the line pressure and the drain pressure in accordance with an electric power supply amount. The hydraulic-pressure control unit outputs such an adjusted hydraulic pressure (the hydraulic control pressure) during it is electrically controlled, while the hydraulic-pressure control unit outputs the line pressure when no electric power is supplied.

The oil supply line, which is also provided for each of the friction elements, connects the hydraulic-pressure control unit and the friction element to each other, so that the hydraulic control pressure outputted from the hydraulic-pressure control unit is supplied to the friction element.

The passage switching unit of the first type, which is provided in at least one of the oil supply lines, changes its communication condition from a first communication state to a second communication state, or vice versa. The friction element is communicated to the hydraulic-pressure control unit in the first communication state, while the friction element is communicated to the drain side in the second communication state.

The hydraulic-pressure output unit is electrically controlled so as to select one of the line pressure and the drain pressure depending on an electric power supply condition and to output a selected hydraulic pressure to the passage switching unit as a hydraulic working pressure.

The passage switching unit of the first type has a first pressure receiving portion for receiving the hydraulic working pressure outputted from the hydraulic-pressure output unit and a second pressure receiving portion for receiving a clutch pressure of the friction element, which is a hydraulic pressure in the friction element. A pressure receiving condition at each of the first and the second pressure receiving portions is changed by controlling the electric power supply to the hydraulic-pressure output unit and the hydraulic-pressure control unit in order to change the communication condition of the passage switching unit from the first communication state to the second communication state, or vice versa.

According to the above feature, it is possible to reduce electric power consumption at the hydraulic-pressure control unit of the N/H type, when the friction element is in its steady state, in which friction plates of the friction element are maintained in an engaged condition or in a dis-engaged condition.

More exactly, when the hydraulic-pressure control unit of the N/H type is used, the hydraulic-pressure output unit as well as the hydraulic-pressure control unit is electrically controlled so as to change the communication condition of the passage switching unit from the first communication state to the second communication state, so that the passage switching unit outputs the drain pressure to the friction element. Accordingly, it is possible to maintain the clutch pressure at a low pressure, without supplying the electric power to the hydraulic-pressure control unit.

On the other hand, when the communication condition of the passage switching unit of the first type is changed from the second communication state to the first communication state, it is possible to output the line pressure from the hydraulic-pressure control unit to the friction element. In other words, it is possible to maintain the clutch pressure at a high pressure, without supplying the electric power to the hydraulic-pressure control unit of the N/H type.

As above, according to the hydraulic control device for the automatic transmission apparatus of the present disclosure, it is possible to reduce the electric power consumption at the hydraulic-pressure control unit of the N/H type when the friction element is in the steady state.

According to another feature of the present disclosure, the first pressure receiving portion and the second pressure receiving portion of the passage switching unit are mechanically coupled to each other, and the communication condition of the passage switching unit is changed to the second communication state, when an acting force by the hydraulic working pressure at the first pressure receiving portion is larger than an acting force by the clutch pressure at the second pressure receiving portion.

When the hydraulic working pressure is high, while the clutch pressure is low, that is, in the case of the second communication state of the passage switching unit, the friction element is communicated to the drain side. In other words, the passage switching unit outputs the drain pressure to the friction element. Therefore, it is possible to maintain the clutch pressure at the low pressure, without supplying the electric power to the hydraulic-pressure control unit of the N/H type.

According to a further feature of the present disclosure, in the passage switching unit, a pressure receiving direction at the first pressure receiving portion for the hydraulic working pressure is opposite to a pressure receiving direction at the second pressure receiving portion for the clutch pressure.

According to the above feature, it is possible to prevent movements of the first and the second pressure receiving portions and to thereby maintain the communication condition of the passage switching unit at the first communication state, even when the hydraulic working pressure is increased in a condition that no electric power is supplied to the hydraulic-pressure control unit and the passage switching unit is in the first communication state.

More exactly, when no electric power is supplied to the hydraulic-pressure control unit and thereby the passage switching unit is in the first communication state, the clutch pressure is maintained at the line pressure and thereby the second pressure receiving portion receives the line pressure. Therefore, even when the hydraulic working pressure is increased and the first pressure receiving portion receives such an increased hydraulic pressure, the movements of the first and the second pressure receiving portions are prevented so as to maintain the first communication state, because the line pressure is applied to the second pressure receiving portion.

According to a still further feature of the hydraulic control device of the present disclosure, the passage switching unit of the first type has a spring for biasing the first and the second pressure receiving portions in a direction opposite to the pressure receiving direction at the first pressure receiving portion for the hydraulic working pressure.

According to the above feature, it is possible to properly bias the first and the second pressure receiving portions for a displacement of the first and the second pressure receiving portions in response to a change of the hydraulic working pressure and/or the clutch pressure.

According to a still further feature of the hydraulic control device of the present disclosure, a hydraulic-pressure control unit of an N/L type (a normally low-pressure type) is provided for each of the friction elements and outputs the drain pressure, when no electric power is supplied thereto. A passage switching unit of a second type changes its communication condition from a first communication state to a third communication state, or vice versa. The friction element is communicated to the hydraulic-pressure control unit in the first communication state, while the friction element is communicated to the hydraulic-pressure producing unit in the third communication state.

The passage switching unit of the second type further has a third pressure receiving portion for receiving the line pressure, in addition to a first and a second pressure receiving portions, which are similar to those of the passage switching unit of the first type. A pressure receiving condition at the first and the second pressure receiving portions is changed by controlling the electric power supply to the hydraulic-pressure output unit and the hydraulic-pressure control unit in order to change the communication condition of the passage switching unit from the first communication state to the third communication state, or vice versa.

According to the above feature, it is possible to reduce electric power consumption at the hydraulic-pressure control unit of the N/L type, when the friction element is in its steady state.

More exactly, when the hydraulic-pressure control unit of the N/L type is used, the hydraulic-pressure output unit as well as the hydraulic-pressure control unit is electrically controlled so as to change the communication condition of the passage switching unit of the second type from the first communication state to the third communication state, so that the passage switching unit of the second type outputs the line pressure to the friction element. Accordingly, it is possible to maintain the clutch pressure at a high pressure, without supplying the electric power to the hydraulic-pressure control unit of the N/L type.

On the other hand, when the communication condition of the passage switching unit of the second type is changed to the first communication state, it is possible to output the drain pressure from the hydraulic-pressure control unit of the N/L type to the friction element without supplying the electric power to the hydraulic-pressure control unit. In other words, it is possible to maintain the clutch pressure at a low pressure, without supplying the electric power to the hydraulic-pressure control unit of the N/L type.

As above, according to the hydraulic control device for the automatic transmission apparatus of the present disclosure, it is possible to reduce the electric power consumption at the hydraulic-pressure control unit of the N/L type when the friction element is in the steady state.

According to a still further feature of the hydraulic control device of the present disclosure, the first pressure receiving portion, the second pressure receiving portion and the third pressure receiving portion are mechanically coupled to one another. The communication condition of the passage switching unit of the second type is changed to the third communication state, when a sum of an acting force by the hydraulic working pressure at the first pressure receiving portion and an acting force by the clutch pressure at the second pressure receiving portion is equal to or larger than an acting force by the line pressure at the third pressure receiving portion.

In other words, when the hydraulic working pressure is high and the clutch pressure is high, the friction element is communicated to the hydraulic-pressure producing unit. Therefore, the passage switching unit of the second type outputs the line pressure to the friction element. As a result, it becomes possible to maintain the clutch pressure at the high pressure without supplying the electric power to the hydraulic-pressure control unit, by changing the hydraulic working pressure to the line pressure.

According to a still further feature of the hydraulic control device of the present disclosure, a pressure receiving direction at the first pressure receiving portion for the hydraulic working pressure as well as a pressure receiving direction at the second pressure receiving portion for the clutch pressure is opposite to a pressure receiving direction at the third pressure receiving portion for the line pressure. In addition, a pressure receiving area at the first pressure receiving portion is smaller than a pressure receiving area at the third pressure receiving portion.

According to the above feature, it is possible to prevent movements of the first to the third pressure receiving portions and to thereby maintain the communication condition of the passage switching unit of the second type at the first communication state, even when the hydraulic working pressure is increased in a condition that no electric power is supplied to the hydraulic-pressure control unit of the N/L type and the passage switching unit of the second type is in the first communication state.

More exactly, when no electric power is supplied to the hydraulic-pressure control unit of the N/L type and thereby the passage switching unit of the second type is in the first communication state, the clutch pressure is maintained at the drain pressure and thereby the second pressure receiving portion receives the drain pressure. Therefore, even when the hydraulic working pressure is increased and the first pressure receiving portion receives such an increased hydraulic pressure, the movements of the first to the third pressure receiving portions are prevented so as to maintain the first communication state, because not only the pressure receiving area at the first pressure receiving portion is smaller than the pressure receiving area at the third pressure receiving portion but also the drain pressure is applied to the second pressure receiving portion.

According to a still further feature of the hydraulic control device of the present disclosure, the passage switching unit of the second type has a spring for biasing the first, the second and the third pressure receiving portions in a direction opposite to the pressure receiving direction at the third pressure receiving portion for the line pressure.

According to the above feature, it is possible to properly bias the first to the third pressure receiving portions for a displacement of the first to the third pressure receiving portions in response to a change of the hydraulic working pressure and/or the clutch pressure.

According to a still further feature of the hydraulic control device of the present disclosure, the electric power is supplied to the hydraulic-pressure output unit in a transient state, in which the friction element is changed from the engaged condition of the friction plates to the dis-engaged condition of the friction plates, or vice versa. On the other hand, no electric power is supplied to the hydraulic-pressure output unit, when the friction element is in the steady state in which either the engaged condition or the dis-engaged condition of the friction plates is maintained.

According to the above feature, it is possible to reduce the electric power consumption at the hydraulic-pressure output unit. More exactly, a time ratio of the steady state with respect to a total operation time period of the vehicle is much larger than a time ratio of the transient state. Therefore, it is possible to reduce the electric power consumption for the hydraulic-pressure output unit, when the electric power is supplied to the hydraulic-pressure output unit only during the transient state, while no electric power is supplied to the hydraulic-pressure output unit during the steady state.

According to a still further feature of the hydraulic control device of the present disclosure, the passage switching unit is maintained in the first communication state during the transient state and an orifice is provided in a working-oil supply line between the passage switching unit and the hydraulic-pressure output unit.

In a case that an accident occurs in an electric power source and the electric power supply to the hydraulic-pressure output unit is thereby stopped during a period, in which the clutch pressure is controlled in the transient state, in other words, in which the first communication state is maintained in the passage switching unit (the N/H type or the N/L type), the hydraulic working pressure may be changed. Namely, the pressure receiving condition at the first pressure receiving portion becomes unstable and thereby the communication condition of the passage switching unit (the N/H type or the N/L type) becomes uncertain.

More exactly, when the electric-power supply accident occurs during a gear-change operation of controlling the clutch pressure, the communication condition of the passage switching unit is either maintained in the first communication state or changed to the second (or the third) communication state depending on the clutch pressure at the timing of the occurrence of the electric-power supply accident. As a result, when the first communication state is maintained, the clutch pressure is fixed to an output pressure of the hydraulic-pressure control unit in case of no electric power supply (that is, a normal pressure of the hydraulic-pressure control unit). On the other hand, when the communication state is changed to the second (or the third) communication state, the clutch pressure is fixed to a value, which is opposite to the normal pressure. Accordingly, it is not certain whether the friction element is moved to the engaged condition or the dis-engaged condition. Then, a so-called "double engagement situation" or "neutral situation" may occur.

In the present disclosure, the orifice is provided in the working-oil supply line, so that the variation of the hydraulic working pressure is absorbed by the orifice and softly transmitted to the passage switching unit, even when the accident of the electric power supply occurs. As a result, a variation of the pressure receiving condition, which is caused by the accident of the electric power supply, can be suppressed at the first pressure receiving portion. Since the first communication state can be thereby maintained in the passage switching unit of the N/H type or the N/L type, it is possible to fix the clutch pressure at the normal pressure even when the accident of the electric power supply occurs.

In other words, even in the case of the accident of the electric power supply, it is possible to fix the clutch pressure of the friction element, the clutch pressure for which is being controlled, at the normal pressure of the hydraulic-pressure control unit of the N/H type or the N/L type. Accordingly, it is possible to avoid the "double engagement situation" or the "neutral situation".

According to a still further feature of the hydraulic control device of the present disclosure, the working-oil supply line has a bypass passage bypassing the orifice and a check valve is provided in the bypass passage. The check valve maintains a closed condition for the bypass passage when no electric current is supplied to the hydraulic-pressure output unit, while the bypass passage is opened by the check valve when the electric power is supplied to the hydraulic-pressure output unit, so that the working oil is allowed to flow through the bypass passage.

In a case that the orifice is provided in the working-oil supply line, a response of the passage switching unit may be generally decreased when changing an operating condition of the friction element from the steady state to the transient state depending on a gear-change demand. In the present disclosure, however, the bypass passage is provided for bypassing the orifice and the check valve is provided in the bypass passage in order to overcome the above problem.

According to the above feature, since the check valve is opened when changing the operating condition of the friction element from the steady state to the transient state, the quick flow of the working oil from the passage switching unit to the hydraulic-pressure output unit can be realized. Therefore, it is possible to avoid the "double engagement situation" or the "neutral situation" (which may occur in the case of the accident of the electric power supply) without delaying the change from the steady state to the transient state.

According to a still further feature of the hydraulic control device of the present disclosure, the passage switching unit (each of the N/H type and the N/L type) has a valve member of a spool type. The first and the second pressure receiving portions or the first to the third pressure receiving portions are formed in the valve member of the spool type.

According to the above feature, it is possible to reduce a manufacturing cost, when compared with a case in which the valve member is composed of a poppet type valve.

According to a still further feature of the hydraulic control device of the present disclosure, the passage switching unit of the first or the second type is provided in each of the multiple oil supply lines, while one hydraulic-pressure output unit is provided for outputting the hydraulic working pressure to at least two passage switching units.

According to the above feature, a number of the hydraulic-pressure output unit can be minimized so as to reduce a manufacturing cost of the hydraulic control device.

BRIEF DESCRIPTION OF THE DRAWINGS

The above and other objects, features and advantages of the present disclosure will become more apparent from the following detailed description made with reference to the accompanying drawings. In the drawings:

FIG. 3A is a table showing engaged or dis-engaged conditions of respective friction elements for each of shift ranges and at each of speed gear positions;

FIG. 3B is a table for showing valve types (an N/H type or an N/L type) of respective hydraulic-pressure control units;

FIG. 10 is a time-series table showing a state transition from a steady state of a third gear position to a steady state of a fourth gear position; and FIG. 11 is a time-series table showing a state transition from the steady state of the fourth gear position to the steady state of the third gear position.

DETAILED DESCRIPTION OF THE EMBODIMENTS

The present disclosure will be explained hereinafter by way of an embodiment with reference to the drawings. However, the present disclosure is not limited to the embodiment.

Structure of Embodiment

A structure of a hydraulic control device 1 according to the embodiment of the present disclosure will be explained with reference to FIGS. 1 to 4.

Figure 1:
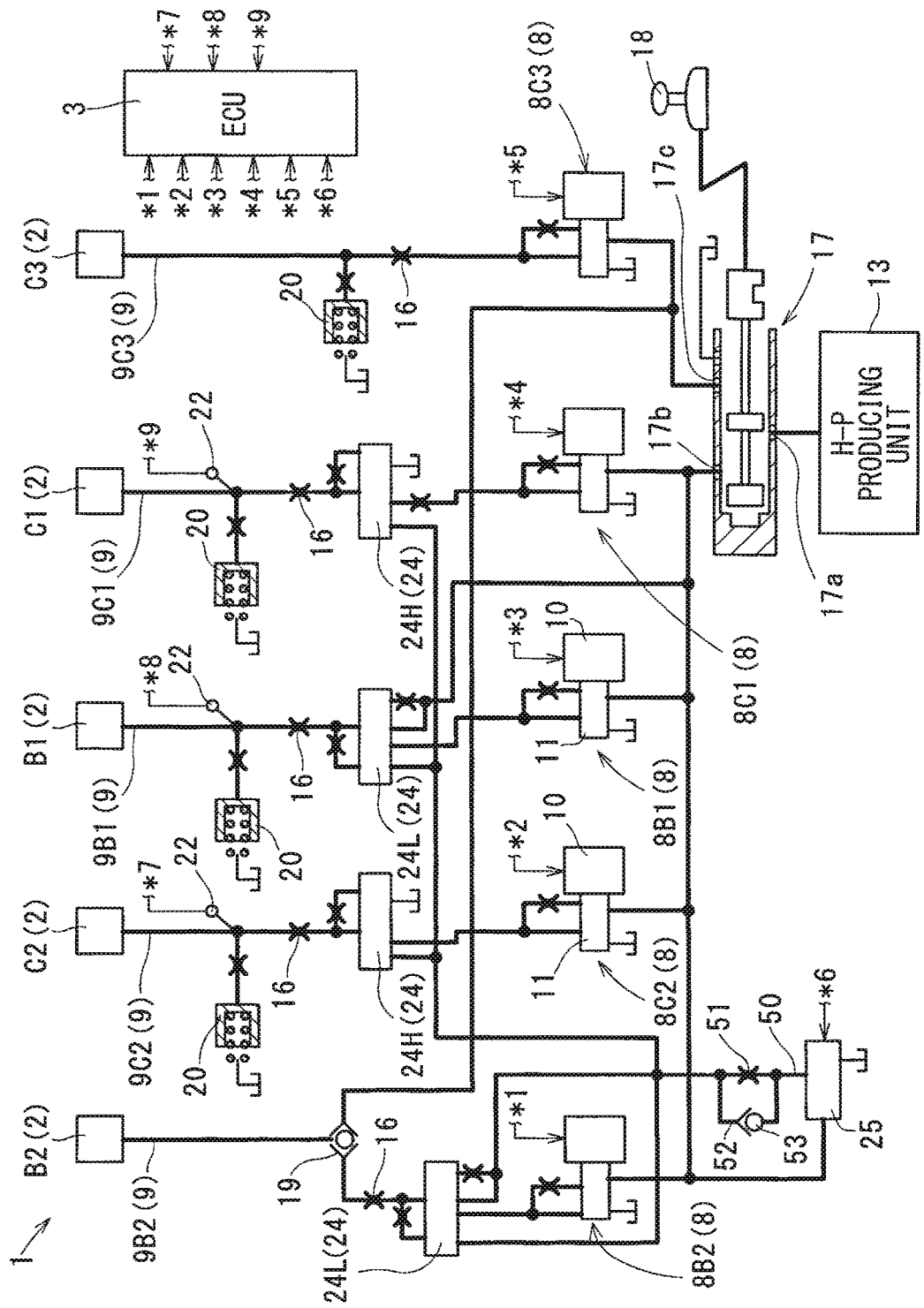
FIG. 1 is a schematic view showing an entire structure of a hydraulic control device.

As shown in FIG. 1, the hydraulic control device 1 controls a hydraulic control pressure of working oil to be supplied to each of friction elements 2 of an automatic transmission apparatus installed in a vehicle. The hydraulic control device 1 includes an electronic control unit 3 (hereinafter, the ECU 3).

The ECU 3 has a micro-computer 3a (shown in FIG. 2), which is composed of an input circuit for processing inputted signals, a CPU for carrying out a controlling and/or a calculation process based on the inputted signals, various kinds of memory devices for memorizing and storing data and/or programs necessary for the controlling process and the calculation process, an output circuit for outputting necessary signals based on a result of the processes by the CPU, and so on.

Figure 2:
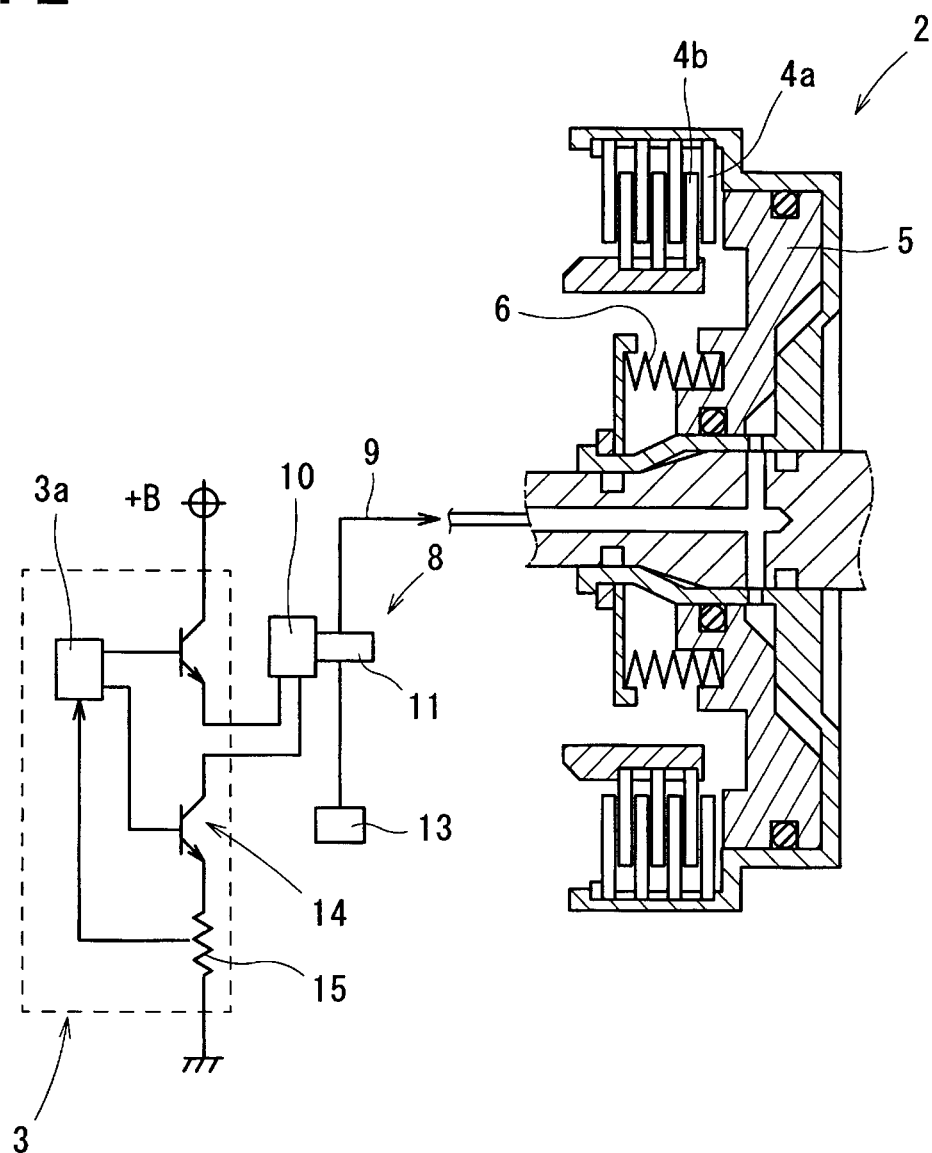
FIG. 2 is a schematic view for showing a cross sectional structure of one of friction elements and for explaining a hydraulic-pressure supply path as well as an electric power supply line to the friction element.

As shown in FIG. 2, each of the friction elements 2 has friction-engagement plates 4a and 4b (hereinafter, the first and the second friction plates 4a and 4b, or simply the friction plates 4a and 4b), which are operatively engaged with each other or separated (dis-engaged) from each other, a piston 5 operated by the hydraulic control pressure of the working oil applied thereto, and a spring 6 for biasing the piston 5 in a direction opposite to a direction of the piston 5 operated by the working oil. The hydraulic control device 1 changes the hydraulic control pressure of the working oil to be supplied to the respective friction element 2 in order to move the piston 5 in accordance with a command signal from the ECU 3, so that the first and the second friction plates 4a and 4b are operatively brought into contact with each other or separated from each other.

The hydraulic control pressure is increased when an operating condition (a coupling condition) of the friction element 2 is changed from a dis-engaged condition to an engaged condition of the first and the second friction plates 4a and 4b, so that the piston 5 is moved in a direction that the first friction plate 4a comes closer to the second friction plated 4b. More exactly, the piston 5 is at first brought into contact with the first friction plate 4a and the first friction plate 4a is then brought into contact with the second friction plate 4b. The hydraulic control pressure of the working oil is increased to such a value that a slip may not occur between the first and the second friction plates 4a and 4b. On the other hand, when the operating condition of the friction element 2 is changed from the engaged condition to the dis-engaged condition of the friction plates 4a and 4b, the hydraulic control pressure of the working oil is decreased in order to move the piston 5 in a direction separating from the first friction plate 4a. The first friction plate 4a is at first separated from the second friction plate 4b. The hydraulic control pressure of the working oil is further decreased so that the piston 5 is finally separated from the first friction plate 4a.

As shown in FIG. 1, the automatic transmission apparatus of the present embodiment is a 4-speed type transmission apparatus, which has a first to a fourth gear positions and five friction elements 2, that is, the friction elements B1, B2, C1, C2 and C3. As shown in FIG. 3A, each of the friction elements 2 (B1, B2, C1-C3) is either in the engaged condition or in the dis-engaged condition for respective gear positions and/or respective shift ranges of a shift lever 18 (FIG. 1).

As shown in FIG. 1, the hydraulic control device 1 is composed of a hydraulic-pressure command unit, multiple hydraulic-pressure control units 8, multiple oil supply lines 9, and so on.

The hydraulic-pressure command unit is a means for calculating a command signal for the hydraulic control pressure, which is respectively supplied to each of the friction elements B1, B2, C1-C3. The hydraulic-pressure command unit is formed by the micro-computer 3a of the ECU 3. The micro-computer 3a changes the command signal (a command value) for the hydraulic control pressure over time, as indicated by a dotted line in FIG. 4, when the friction element 2 is changed from the dis-engaged condition to the engaged condition or from the engaged condition to the dis-engaged condition of the friction plates 4a and 4b.

Each of the hydraulic-pressure control units 8 is composed of a solenoid 10 to which electric power is supplied depending on the command value for the hydraulic control pressure, and a valve portion 11 an opening degree of which is controlled depending on a value of the electric power supplied to the solenoid 10. Hereinafter, the hydraulic-pressure control unit 8 is also referred to as a pressure control valve 8. The pressure control valve 8 is provided for each of the friction elements 2 (B1, B2, C1-C3), so that the hydraulic pressure produced at a hydraulic-pressure producing unit 13 (hereinafter, the hydraulic pressure source 13) is respectively adjusted and supplied to each of the friction elements 2 as the hydraulic control pressure. In other words, the pressure control valve 8 is provided between the hydraulic pressure source 13 and a drain side in order to adjust the hydraulic pressure at a value between a source-side hydraulic pressure (outputted from the hydraulic pressure source 13) and a drain-side hydraulic pressure depending on the value of the electric power supplied to the solenoid 10. Such adjusted hydraulic pressure is outputted from the pressure control valve 8 to the respective friction element 2.

The pressure control valve 8 has a feed-back function so as to stabilize the hydraulic control pressure to be outputted therefrom, according to which an outputted hydraulic control pressure is feed-backed to a feed-back chamber (not shown) of the pressure control valve 8, in the same manner to a well-known electromagnetic spool valve, for example, as disclosed in Japanese Patent Publication No. 2007-139181.

Hereinafter, the hydraulic control pressure outputted from the hydraulic pressure source 13 is also referred to as "a line pressure", while the drain-side hydraulic pressure is referred to as "a drain pressure". The solenoid 10 and the valve portion 11 of the pressure control valve 8 are respectively referred to as "a first solenoid 10" and "a first valve portion 11". In addition, each of the pressure control valves 8 for the friction elements 2 (B1, B2, C1-C3) is respectively referred to as "8B1", "8B2", "8C1", "8O2" and "8O3", when it is necessary to differentiate the respective pressure control valves 8 from one another.

The hydraulic pressure source 13 is composed of a mechanical-type oil pump (not shown) driven by an engine (not shown) and an electromagnetic valve (not shown) for adjusting the hydraulic pressure to be outputted therefrom, each of which has a well-known structure.

The value of the electric power supply to the first solenoid 10 is, for example, feed-back controlled by the ECU 3.

As shown in FIG. 2, the ECU 3 has a driver circuit 14 for increasing or decreasing the electric power supply to the first solenoid 10 depending on a control signal outputted from the micro-computer 3a and an electric current sensor 15 for detecting the electric power supply to the first solenoid 10. The micro-computer 3a calculates a command value for the electric power supply depending on the command value for the hydraulic control pressure and produces the control signal to be supplied to the driver circuit 14 depending on the command value for the electric power supply.

In addition, the micro-computer 3a receives a detection signal from the electric current sensor 15 to read a detection value for the electric power supply. The micro-computer 3a compares the detection value with the command value for the electric power supply and changes, for example, a duty ratio of the control signal based on a comparison result between the detection value and the command value.

Each of the pressure control valves 8 is composed of a normally low-pressure type valve (hereinafter, the N/L type valve), which outputs the drain pressure when no electric power is supplied to the first solenoid 10, or a normally high-pressure type valve (hereinafter, the N/H type valve), which outputs the line pressure when no electric power is supplied to the first solenoid 10.

The valve type (the N/L type or the N/H type) for each pressure control valve 8 is indicated in the table shown in FIG. 3B.

The oil supply line 9 is a part of a hydraulic circuit from the hydraulic pressure source 13 to the respective friction elements 2. The oil supply line 9 is provided for each of the friction elements 2 (B1, B2, C1-C3) for respectively connecting each pressure control valve 8 (8B1, 8B2, 8C1-8C3) to each friction element 2 (B1, B2, C1-C3). As above, the oil supply line 9 is a hydraulic supply line for supplying the hydraulic control pressure of the working oil adjusted by the pressure control valve 8 to the friction element 2. As shown in FIG. 1, an orifice 16 is provided in each of the oil supply lines 9 in order to suppress a rapid supply of the hydraulic control pressure to the friction element 2.

Each of the oil supply lines 9 for the respective friction elements 2 (B1, B2, C1-C3) is respectively referred to as "9B1", "9B2", "9C1", "9C2" and "9C3", when it is necessary to differentiate the oil supply lines 9 from one another.

As shown in FIG. 1, a manual valve 17 is provided in the hydraulic circuit between the hydraulic pressure source 13 and the respective oil supply lines 9, so that the manual valve 17 switches over a hydraulic connecting mode of the line pressure from a first connecting mode to be connected to the oil supply lines 9 for a vehicle forward movement to a second connecting mode to be connected to the oil supply lines 9 for a vehicle backward movement, or vice versa. Therefore, the manual valve 17 has an input port 17a for receiving the line pressure from the hydraulic pressure source 13, a first output port 17b (a forward-movement side port) for outputting the line pressure to the friction elements 2, the friction plates 4a and 4b of which are engaged with each other when the shift lever 18 is moved to a D-range or an L-range, and a second output port 17c (a backward-movement side port) for outputting the line pressure to the friction elements 2, the friction plates 4a and 4b of which are engaged with each other when the shift lever 18 is moved to an R-range.

The manual valve 17 is moved by an operation of the shift lever 18 by a vehicle driver, so that a valve position is changed to a first communication position (for the first connecting mode) in which the input port 17a is communicated to the first output port 17b, and a second communication position (for the second connecting mode) in which the input port 17a is communicated to the second output port 17c.

Hereinafter, the line pressure outputted from the first output port 17b is referred to as a D-range pressure, while the line pressure outputted from the second output port 17c is referred to as an R-range pressure, when it is necessary to differentiate the line pressure from each other.

In the friction element B2, the friction plates 4a and 4b are engaged with each other, when the shift lever 18 is moved to the L-range (for the vehicle forward movement) or the R-range (for the vehicle backward movement). A shuttle valve 19 is, therefore, provided in the oil supply line 9B2, so that the D-range pressure is adjusted by the pressure control valve 8B2 and supplied to the friction element B2 in the case of the L-range, while the R-range pressure is directly supplied to the friction element B2 in the case of the R-range.

As shown in FIG. 1, an accumulator 20 is provided in each of the oil supply lines 9B1, 9C1, 9C2 and 9C3 between the orifice 16 and the respective friction element B1, C1, C2 and C3. In addition, an oil pressure sensor 22 is provided in each of the oil supply lines 9B1, 9C1 and 9C2 in order to detect an oil pressure at a downstream side of the orifice 16.

An operation of the hydraulic control device 1 will be explained with reference to FIG. 4 along with a process of the ECU 3.

At first, the ECU 3 controls each of the friction elements 2 in either one of two operating conditions, that is, in a no-gear-change operating condition or in a gear-change operating condition.

The no-gear-change operating condition corresponds to a steady state of the automatic transmission apparatus in which there is no demand for a gear change of the automatic transmission apparatus, so that the friction plates 4a and 4b maintain the engaged condition or the dis-engaged condition and that the hydraulic pressure in the friction element 2 is maintained either at the line pressure or at the drain pressure.

The gear-change operating condition corresponds to a transient state of the automatic transmission apparatus in which there is the demand for the gear-change (hereinafter, the gear-change demand), so that the friction plates 4a and 4b of the respective friction elements 2 are changed from the engaged condition to the dis-engaged condition or from the dis-engaged condition to the engaged condition depending on the gear-change demand. Therefore, the hydraulic pressure in the respective friction element 2 is changed from the line pressure to the drain pressure or from the drain pressure to the line pressure.

Figure 4:
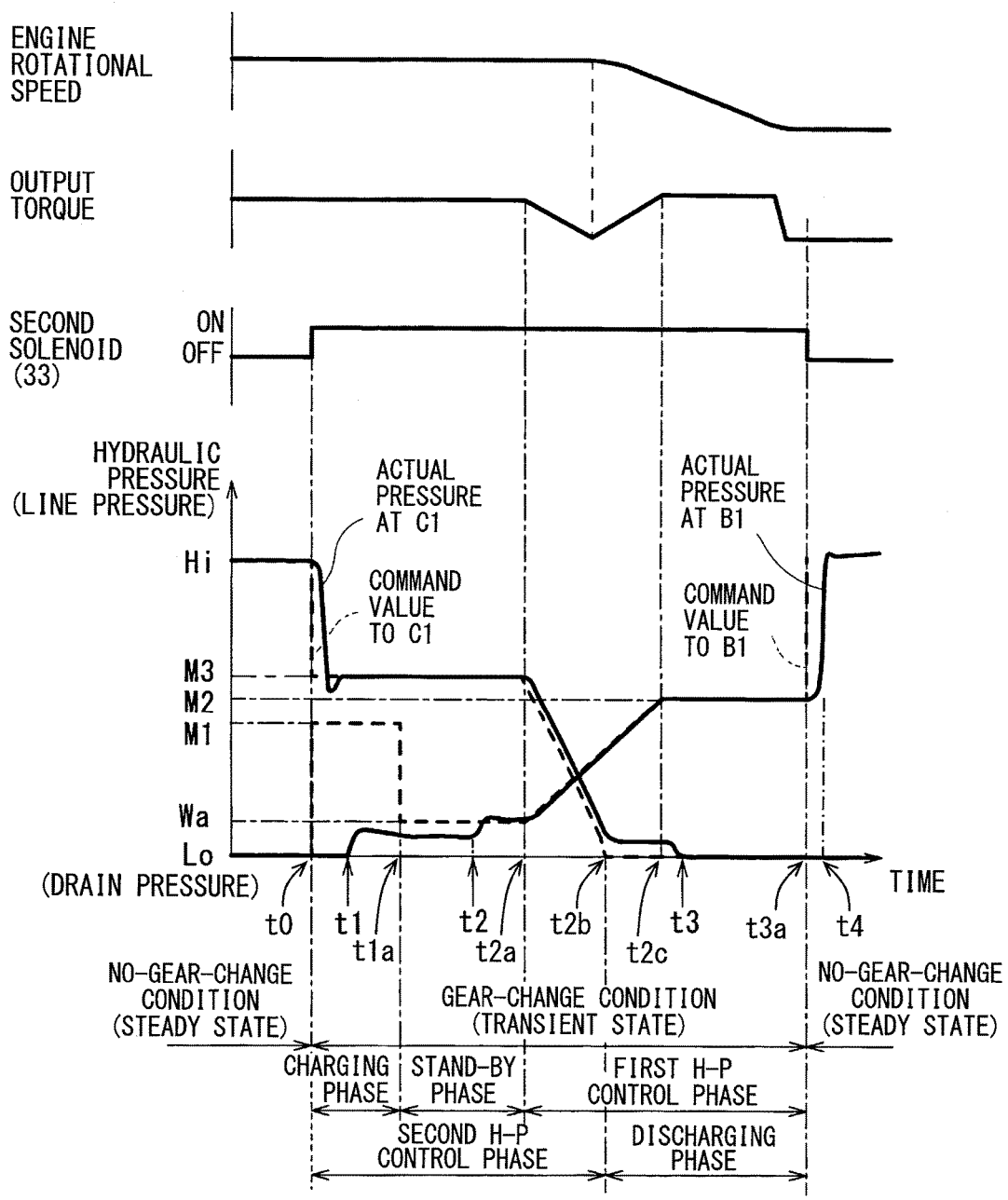
FIG. 4 is a time chart showing an operation of the hydraulic control device.

A time chart of FIG. 4 shows an engine rotational speed, an output torque, the hydraulic pressures in the friction elements B1 and C1, and the command values for the hydraulic control pressure to be supplied to the friction elements B1 and C1, when the shift lever 18 is moved from a third gear position to a fourth gear position. The hydraulic pressure in the friction element 2 is also referred to as a clutch pressure.

As shown in the table of FIG. 3A, the friction plates 4a and 4b of the friction element B1 are changed from the dis-engaged condition to the engaged condition, when the shift lever 18 is changed from the third gear position to the fourth gear position. In other words, the hydraulic pressure (the clutch pressure) in the friction element B1 is changed from the drain pressure to the line pressure. On the other hand, the friction plates 4a and 4b of the friction element C1 are changed from the engaged condition to the dis-engaged condition, so that the hydraulic pressure (the clutch pressure) in the friction element C1 is changed from the line pressure to the drain pressure.

Then, the ECU 3 further controls the friction element B1 in three control phases (that is, a charging phase, a stand-by phase and a first hydraulic-pressure control phase) during the gear-change operating condition in which the friction plates 4a and 4b of the friction element B1 are changed from the dis-engaged condition to the engaged condition. In addition, the ECU 3 controls the friction element C1 in two control phases (that is, a second hydraulic-pressure control phase and a discharging phase) during the gear-change operating condition in which the friction plates 4a and 4b of the friction element C1 are changed from the engaged condition to the dis-engaged condition.

The charging phase is a process, according to which the hydraulic control pressure is charged into the friction element B1 when the gear-change demand is generated at a timing "t0". In other words, the ECU 3 increases the command value of the hydraulic control pressure for the friction element B1 in a step-wise manner from a low pressure "Lo" (corresponding to the drain pressure) to a first middle pressure "M1", as indicated by a dotted line, when the gear-change demand is generated at the timing "t0". The ECU 3 maintains the command value at the first middle pressure "M1" during a period from the timing "t0" to a timing "t1a", which is defined as the charging phase.

According to the above process, the electric power is supplied to the first solenoid 10 of the pressure control valve 8B1 and a valve member of the first valve portion 11 is moved to such a valve opening position corresponding to the first middle pressure "M1" (that is, a fluid passage of the first valve portion 11 is opened to such a passage opening position corresponding to the first middle pressure "M1"). The hydraulic control pressure is absorbed by the orifice 16 and softly charged into the friction element B1. The charging process is completed in mid-stream at a timing "t1" of the charging phase ("t0"-"t1a"), so that the hydraulic pressure in the friction element B1 is increased to a value, which is slightly higher than the drain pressure, as indicated by a solid line. As a result, the piston 5 starts its movement toward the first friction plate 4a.

The stand-by phase corresponds to a process, in which the command value of the hydraulic control pressure is decreased to a predetermined stand-by pressure "Wa" and maintained at the stand-by pressure "Wa" until the command value of the hydraulic control pressure is increased again.

In other words, the ECU 3 decreases the command value of the hydraulic control pressure for the friction element B1 from the first middle pressure "M1" to the stand-by pressure "Wa" in a step-wise manner at the timing "t1a", as indicated by the dotted line, when the period of the charging phase ("t0"-"t1a") has ended. As a result, the command value of the hydraulic control pressure for the friction element B1 is maintained at the stand-by pressure "Wa" in a period (from the timing "t1a" to a timing "t2a"), which is defined as the stand-by phase.

According to the above process, the valve member of the first valve portion 11 for the pressure control valve 8B1 is moved to such a valve opening position corresponding to the stand-by pressure "Wa" (that is, the fluid passage of the first valve portion 11 is opened to such a passage opening position corresponding to the stand-by pressure "Wa"). The piston 5 is softly brought into contact with the first friction plate 4a at a timing "t2" and the first friction plate 4a is thereby pushed by the piston 5, so that the first friction plate 4a starts its movement toward the second friction plate 4b.

The first hydraulic-pressure control phase, which is carried out in order that the friction plates 4a and 4b of the friction element B1 are changed from the dis-engaged condition to the engaged condition, corresponds to a process for controlling the hydraulic control pressure in order to softly bring the friction plates 4a and 4b into contact with each other.

More exactly, when the stand-by phase has ended at the timing "t2a", the ECU 3 increases the command value of the hydraulic control pressure for the friction element B1 in a linear-function manner from the stand-by pressure "Wa" to a second middle pressure "M2", as indicated by the dotted line (in a period from "t2a" to "t2c"). The ECU 3 maintains the command value of the hydraulic control pressure at the second middle pressure "M2" after the timing "t2c" (in a period from "t2c" to "t3a"). According to the above process, the electric power supply to the first solenoid 10 of the pressure control valve 8B1 is controlled in such a way that the fluid passage of the first valve portion 11 is opened to such a passage opening position corresponding to the command value of the hydraulic control pressure, which is continuously increased in the period from "t2a" to "t2c". Thereafter, the fluid passage of the first valve portion 11 is opened to and maintained at such a passage opening position corresponding to the second middle pressure "M2" in the period from "t2c" to "t3a".

During the above period from the timing "t2a" to the timing "t3a" for the first hydraulic-pressure control phase, each of the friction plates 4a and 4b of the friction element B1 is rotated relative to each other in a sliding movement while the output torque of the engine is gradually transmitted to the vehicle wheels. In other words, the sliding movements between the friction plates 4a and 4b will be gradually made smaller and finally become zero. Then, the ECU 3 increases the command value of the hydraulic control pressure in a step-wise manner from the second middle pressure "M2" to a high pressure "Hi" (which corresponds to the line pressure), as indicated by the dotted line, at an end (the timing "t3a") of the first hydraulic-pressure control phase ("t2a"-"t3a"). According to the above process, the electric power supply to the first solenoid 10 of the pressure control valve 8B1 is controlled in such a way that the fluid passage of the first valve portion 11 is opened to such a passage opening position corresponding to the high pressure "Hi". As a result, the hydraulic pressure in the friction element B1 is increased to the line pressure.

The second hydraulic-pressure control phase, which is carried out in order that the friction plates 4a and 4b of the friction element C1 are changed from the engaged condition to the dis-engaged condition, corresponds to a process for controlling the hydraulic control pressure in order to softly separate the friction plates 4a and 4b from each other.

More exactly, the ECU 3 starts the second hydraulic-pressure control phase for the friction element C1 at the same time (at the timing "t0") when starting the charging phase for the friction element B1. The ECU 3 decreases the command value of the hydraulic control pressure for the friction element C1 in a step-wise manner from the high pressure "Hi" to a third middle pressure "M3", as indicated by a dotted line and then maintains the command value of the hydraulic control pressure at the third middle pressure "M3" in a period from the timing "t0" to the timing "t2a". Thereafter, the ECU 3 decreases the command value of the hydraulic control pressure for the friction element C1 in a linear-function manner from the third middle pressure "M3" to the low pressure "Lo" in a period from the timing "t2a" to a timing "t2b", as indicated by the dotted line.

According to the above process, the electric power supply to the first solenoid 10 of the pressure control valve 8C1 is controlled in such a way that the fluid passage of the first valve portion 11 of the pressure control valve 8C1 is opened to such a passage opening position corresponding to the third middle pressure "M3" ("t0"-"t2a"). Thereafter, the fluid passage of the first valve portion 11 is controlled to such a passage opening position corresponding to the command value of the hydraulic control pressure, which is continuously decreased from the third middle pressure "M3" to the low pressure "Lo" in the period from "t2a" to "t2b".

During the above period from the timing "t0" to the timing "t2b" for the second hydraulic-pressure control phase, each of the friction plates 4a and 4b of the friction element C1 is rotated relative to each other in the sliding movement, while the output torque of the engine is transmitted to the vehicle wheels. The output torque to be transmitted to the vehicle wheels is gradually decreased in the period from "t2a" to "t2b".

The discharging phase is a process, according to which the hydraulic pressure is discharged from the friction element C1.

More exactly, the ECU 3 maintains the command value of the hydraulic control pressure for the friction element C1 at the low pressure "Lo" in a period from the timing "t2b" to the timing "t3a". According to the above process, the electric power supply to the first solenoid 10 of the pressure control valve 8C1 is controlled in such a way that the fluid passage of the first valve portion 11 is opened to such a passage opening position corresponding to the low pressure "Lo", as indicated by a solid line (in a period from "t2b" to "t3") and that the hydraulic pressure is discharged from the friction element C1. During the above period "t2b" to "t3", the hydraulic pressure in the friction element C1 is maintained at a value slightly higher than the drain pressure. The discharge of the hydraulic pressure is completed in mid-stream (at the timing "t3") of the discharging phase and the hydraulic pressure in the friction element C1 is decreased to the drain pressure.

Characterizing Portions of Embodiment

A characterizing structure of the hydraulic control device 1 of the present embodiment will be explained with reference to FIGS. 5 to 9.

The hydraulic control device 1 has multiple passage switching units 24 (the passage switching units 24H of a first type and the passage switching units 24L of a second type) and a hydraulic-pressure output unit 25, as explained below.

Each of the passage switching units 24 (24H/24L) is provided in the respective oil supply line 9 (FIG. 1). Each of the passage switching units 24 (24H/24L) has a spool 26H/26L as a valve member, which is moved depending on a balance between hydraulic pressures applied to the spool 26H/26L and a biasing force of a spring 28H/28L.

The passage switching units 24 are composed of the passage switching valves 24H of the first type, each of which is respectively provided in the oil supply line 9C1/9C2 connected to the N/H type pressure control valve 8C1/8C2, and the passage switching valves 24L of the second type, each of which is respectively provided in the oil supply line 9B1/9B2 connected to the N/L type pressure control valve 8B1/8B2. A letter "H" is added to each of reference numerals for respective parts (the spool, the spring and so on) of the passage switching valve 24H of the first type, while a letter "L" is added to each of reference numerals for respective parts (the spool, the spring and so on) of the passage switching valve 24L of the second type.

Figure 5:
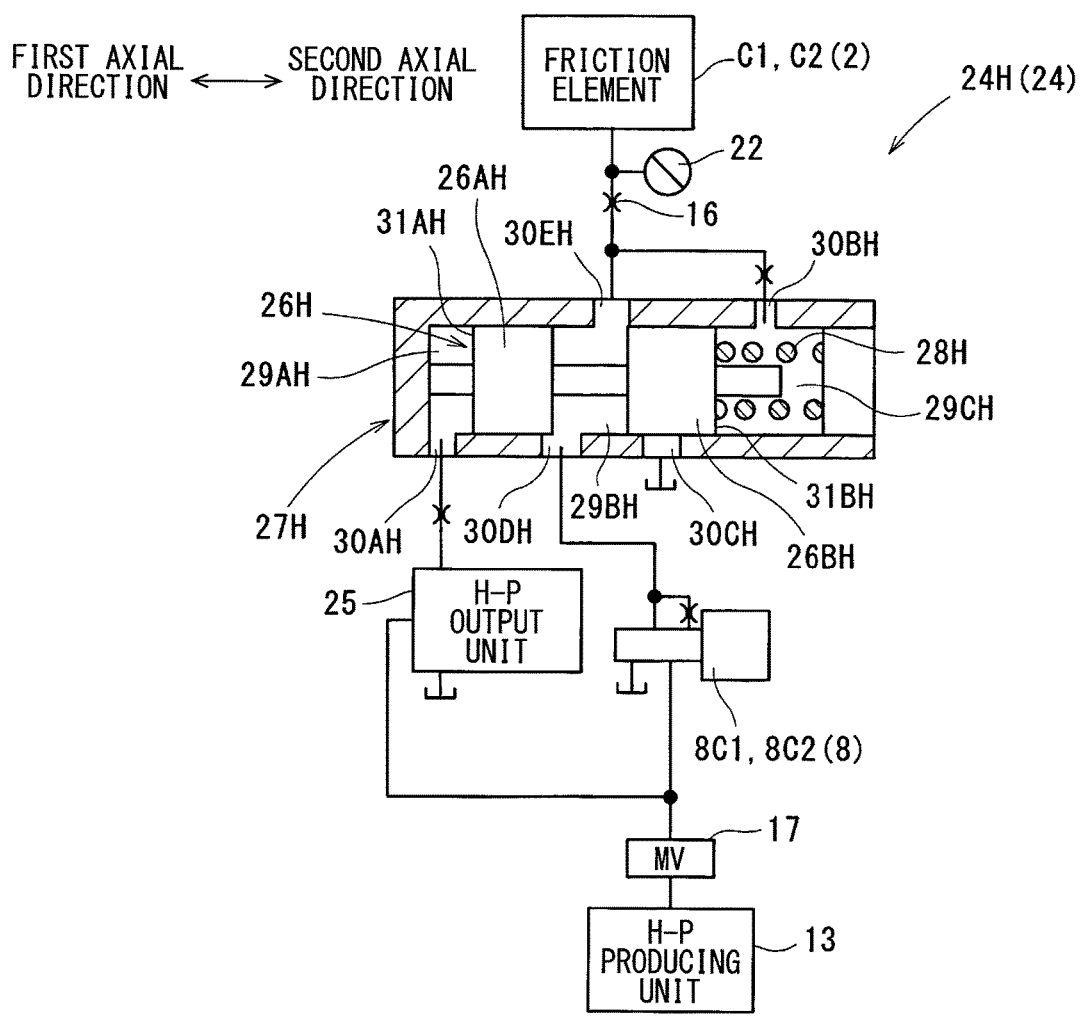
FIG. 5 is a schematic view showing a structure of a passage switching unit of a first type, which is connected to the hydraulic-pressure control unit of the N/H type, wherein the passage switching unit is in a first communication state.
Figure 6:
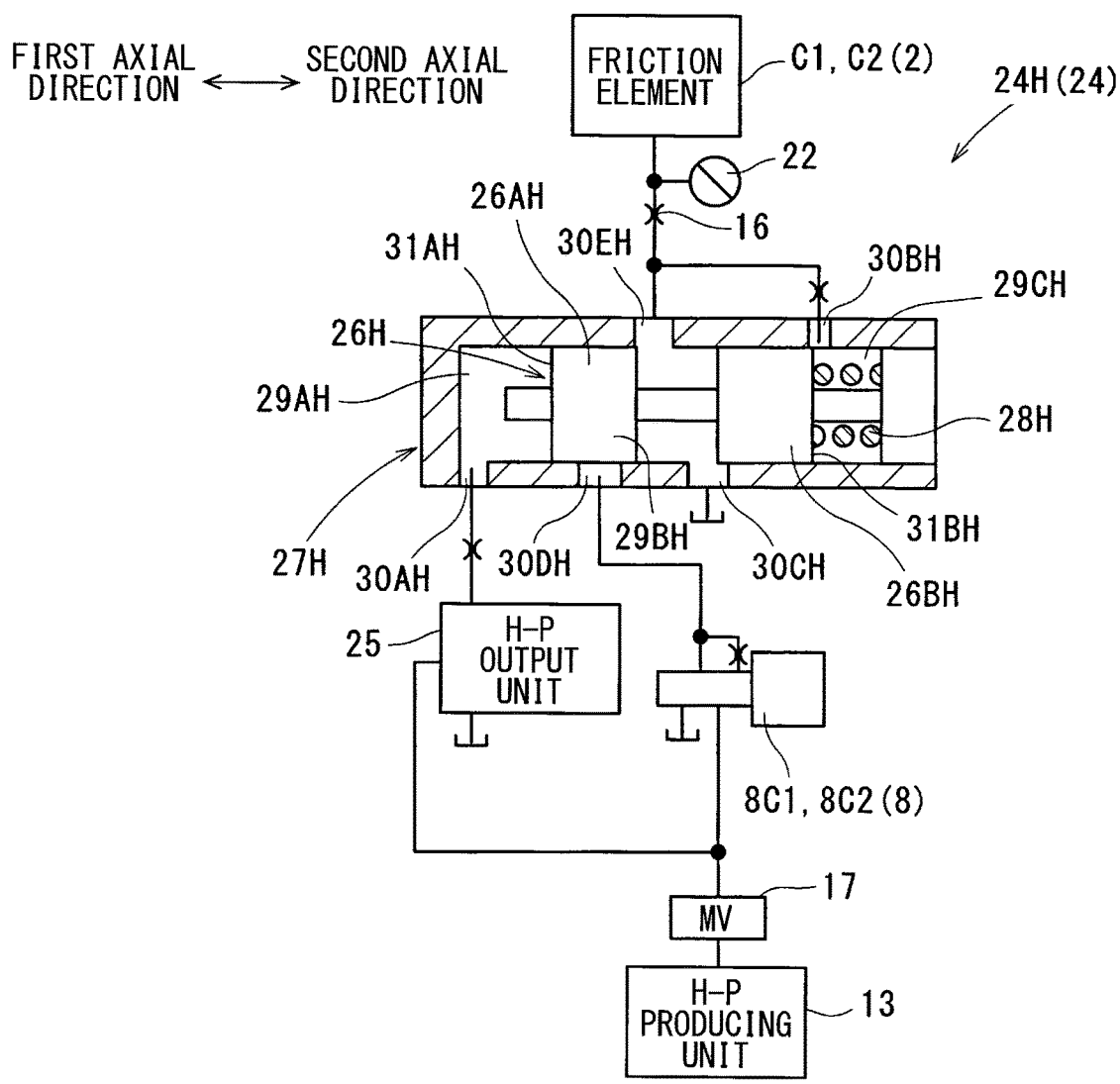
FIG. 6 is a schematic view showing the structure of the passage switching unit of the first type, which is connected to the hydraulic-pressure control unit of the N/H type, wherein the passage switching unit is in a second communication state.

Each of the passage switching valves 24H of the first type, which is provided in the respective oil supply line 9C1/9C2, switches over its communication condition from a first communication state to a second communication state, or vice versa. As shown in FIGS. 5 and 6, in the first communication state, the friction element 2 (C1/C2) is communicated to the pressure control valve 8 (8C1/8C2) of the N/H type, while in the second communication state, the friction element 2 (C1/C2) is communicated to the drain side.

More exactly, the passage switching valve 24H of the first type provided in the oil supply line 9C1 switches over the communication condition from the first communication state connecting the friction element C1 to the pressure control valve 8C1 to the second communication state connecting the friction element C1 to the drain side, or vice versa. The passage switching valve 24H provided in the oil supply line 9C2 likewise switches over the communication condition from the first communication state connecting the friction element C2 to the pressure control valve 8C2 to the second communication state connecting the friction element C2 to the drain side, or vice versa.

Figure 7:
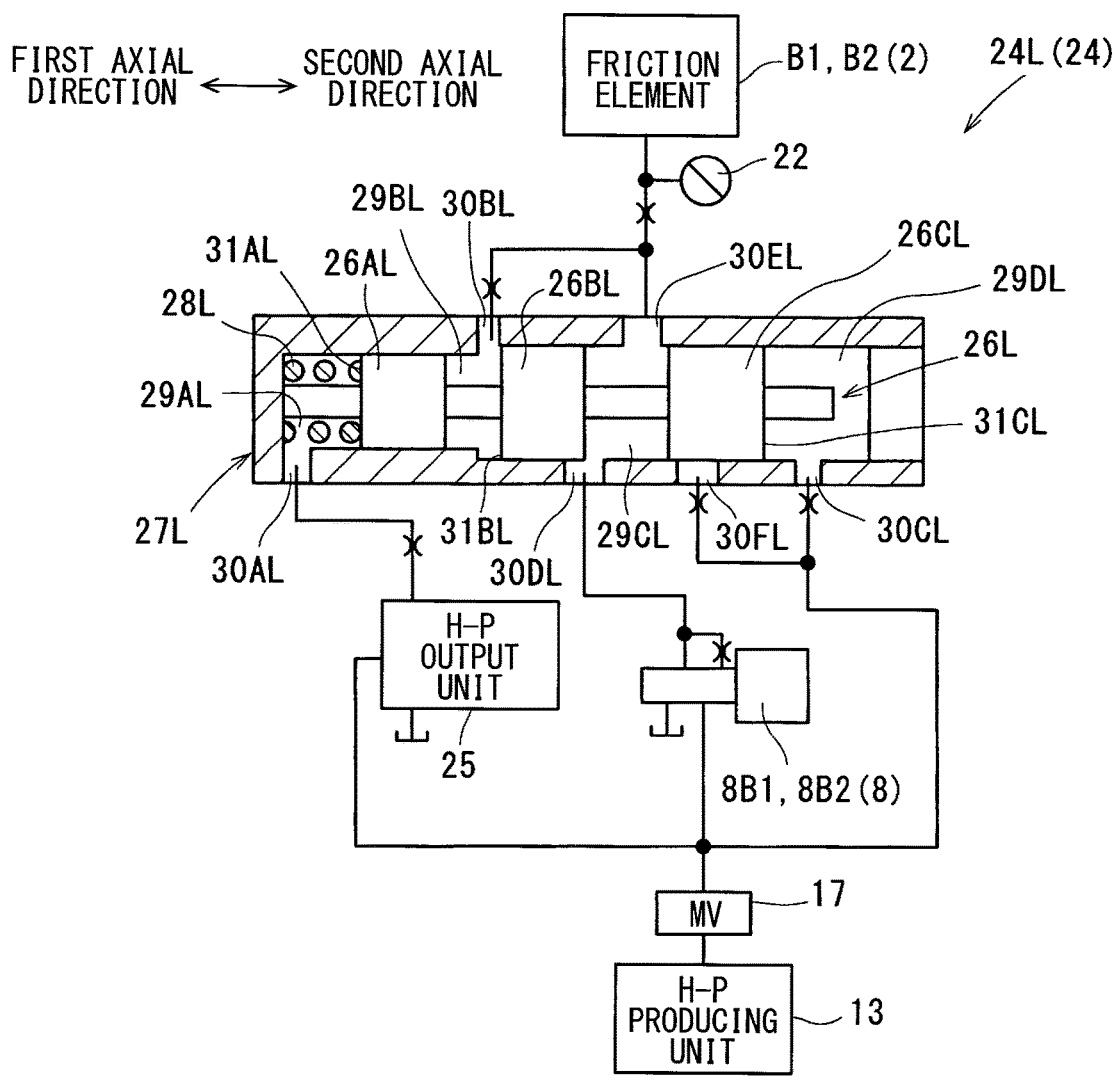
FIG. 7 is a schematic view showing a structure of a passage switching unit of a second type, which is connected to the hydraulic-pressure control unit of the N/L type, wherein the passage switching unit is in a first communication state.
Figure 8:
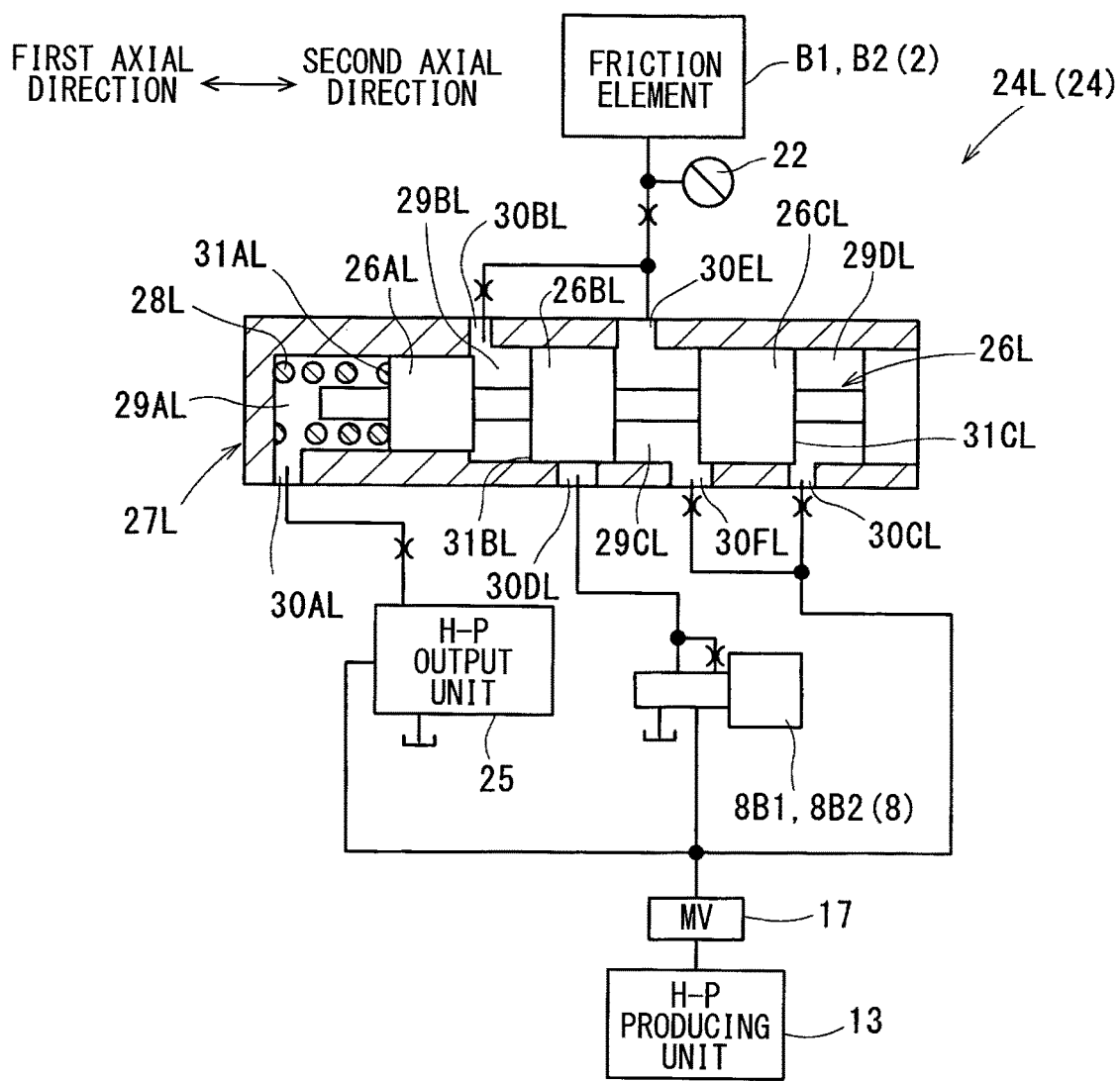
FIG. 8 is a schematic view showing the structure of the passage switching unit of the second type, which is connected to the hydraulic-pressure control unit of the NL type, wherein the passage switching unit is in a third communication state.

Each of the passage switching valves 24L of the second type, which is provided in the respective oil supply line 9B1/9B2, switches over its communication condition from a first communication state to a third communication state, or vice versa. As shown in FIGS. 7 and 8, in the first communication state, the friction element 2 (B1/B2) is communicated to the pressure control valve 8 (8B1/8B2) of the N/L type, while in the third communication state, the friction element 2 (B1/B2) is communicated to the hydraulic pressure source 13.

More exactly, the passage switching valve 24L of the second type provided in the oil supply line 9B1 switches over the communication condition from the first communication state connecting the friction element B1 to the pressure control valve 8B1 to the third communication state connecting the friction element B1 to the hydraulic pressure source 13, or vice versa. The passage switching valve 24L provided in the oil supply line 9B2 likewise switches over the communication condition from the first communication state connecting the friction element B2 to the pressure control valve 8B2 to the third communication state connecting the friction element B2 to the hydraulic pressure source 13, or vice versa.

In the third communication state, the hydraulic pressure source 13 is communicated to the friction elements B1 and B2 via the manual valve 17.

The hydraulic-pressure output unit 25 is electrically controlled by the ECU 3, so that the hydraulic-pressure output unit 25 selects one of the line pressure and the drain pressure depending on an electric power supply condition by the ECU 3. The selected hydraulic pressure (the line pressure or the drain pressure) is outputted to the passage switching valves 24H and 24L. The hydraulic-pressure output unit 25 works as an actuator for the passage switching valves 24H and 24L.

Hereinafter, the hydraulic pressure outputted from the hydraulic-pressure output unit 25 is also referred to as a hydraulic working pressure. The hydraulic-pressure output unit 25 is also referred to as a working-pressure output valve 25.

In the present embodiment, one hydraulic-pressure output unit 25 (that is, one working-pressure output valve 25) is provided in order to supply the hydraulic pressure (the hydraulic working pressure) to all of the passage switching valves 24H and 24L. Hereinafter, the passage switching valves 24H and 24L and the working-pressure output valve 25 will be further explained in detail.

As shown in FIGS. 5 and 6, the passage switching valve 24H of the first type has the spool 26H as the valve member and a sleeve 27H as a housing for movably accommodating the spool 26H. The spool 26H is biased by the spring 28H in an axial direction of the spool 26H in a left-hand direction in the drawings.

The spool 26H has two (first and second) lands 26AH and 26BH, each of which is in a sliding contact with an inner peripheral surface of the sleeve 27H. Each of the lands 26AH and 26BH has the same outer diameter to each other. The first and the second lands 26AH and 26BH are axially arranged at positions in an order of the first land 26AH and the second land 26BH in a direction to one of axial ends of the spool 26H (a right-hand direction). An inside space of the sleeve 27H is divided into three oil chambers, that is, a first oil chamber 29AH formed at an axial side of the first land 26AH on one of axial ends of the spool 26H, a second oil chamber 29BH formed between the first and the second lands 26AH and 26BH, and a third oil chamber 29CH formed at an axial side of the second land 26BH on the other axial end of the spool 26H. Each of the oil chambers 29AH, 29BH and 29CH changes its volume and its relative position with respect to the sleeve 27H in the axial direction, when the spool 26H is moved in its axial direction relative to the sleeve 27H.

The sleeve 27H has several ports 30AH to 30EH. The port 30AH is an inlet port for introducing the hydraulic working pressure into the inside space of the sleeve 27H. The port 30AH is always in communication to the first oil chamber 29AH. The port 30BH is another inlet port for introducing the clutch pressure (the hydraulic pressure of the friction element 2) into the inside space of the sleeve 27H. The port 30BH is always in communication to the third oil chamber 29CH.

The port 30CH is a further inlet port for introducing the drain pressure into the inside space of the sleeve 27H. The port 30CH is operatively communicated to the second oil chamber 29BH by the second land 26BH. More exactly, when the spool 26H is moved in a right-hand direction in FIG. 5 (hereinafter, s second axial direction), the port 30CH is communicated to the second oil chamber 29BH, while the communication between the port 30CH and the second oil chamber 29BH is blocked off by the second land 26BH when the spool 26H is moved in a left-hand direction in FIG. 5 (hereinafter, a first axial direction).

The port 30DH is a further inlet port for introducing the hydraulic control pressure outputted from the pressure control valve 8 into the inside space of the sleeve 27H. The port 30DH is operatively communicated to the second oil chamber 29BH by the first land 26AH. More exactly, when the spool 26H is moved in the left-hand direction (the first axial direction), the port 30DH is communicated to the second oil chamber 29BH, while the communication between the port 30DH and the second oil chamber 29BH is blocked off by the first land 26AH when the spool 26H is moved in the right-hand direction (the second axial direction).

The port 30EH is an outlet port for outputting the hydraulic pressure, which is introduced into the second oil chamber 29BH either from the port 30CH or from the port 30DH, to the friction element 2. The port 30EH is always in communication to the second oil chamber 29BH.

The spring 28H is provided in the third oil chamber 29CH for biasing the spool 26H in the first axial direction.

In the above passage switching valve 24H of the first type, an axial end surface of the first land 26AH (a left-hand side surface) functions as a first pressure receiving portion 31AH for receiving the hydraulic working pressure of the working oil from the working-pressure output valve 25, while an axial end surface of the second land 26BH (a right-hand side surface) functions as a second pressure receiving portion 31BH for receiving the clutch pressure from the friction element 2. A direction of the hydraulic working pressure at the first pressure receiving portion 31AH and a direction of the clutch pressure at the second pressure receiving portion 31BH are opposite to each other in the axial direction of the spool 26H. The spring 28H biases the spool 26H in the first axial direction, which is opposite to the direction of the hydraulic working pressure at the first pressure receiving portion 31AH.

When an acting force of the hydraulic working pressure at the first pressure receiving portion 31AH becomes larger than an acting force of the clutch pressure at the second pressure receiving portion 31BH, the communication condition of the passage switching valve 24H of the first type is changed by a spring force of the spring 28H from the first communication state (FIG. 5) to the second communication state (FIG. 6).

As shown in FIGS. 7 and 8, the passage switching valve 24L of the second type has the spool 26L as the valve member and a sleeve 27L as a housing for movably accommodating the spool 26L. The spool 26L is biased by the spring 28L in a second axial direction of the spool 26L (in a right-hand direction in the drawing).

The spool 26L has three (first to third) lands 26AL, 26BL and 26CL, each of which is in a sliding contact with an inner peripheral surface of the sleeve 27L. Each of the second and the third lands 26BL and 26CL has the same diameter to each other, while a diameter of the first land 26AL is smaller than that of the other lands 26BL and 26CL. The first to the third lands 26AL, 26BL and 26CL are axially arranged at positions in an order of the first land 26AL, the second land 26BL and the third land 26CL in a direction to one of axial ends of the spool 26L (in the right-hand direction=the second axial direction). An inside space of the sleeve 27L is divided into four oil chambers, that is, a first oil chamber 29AL formed at an axial side of the first land 26AL on one of axial ends of the spool 26L, a second oil chamber 29BL formed between the first and the second lands 26AL and 26BL, a third oil chamber 29CL formed between the second and the third lands 26BL and 26CL, and a fourth oil chamber 29DL formed at an axial side of the third land 26CL on the other axial end of the spool 26L. Each of the oil chambers 29AL, 29BL, 29CL and 29DL changes its volume and its relative position with respect to the sleeve 27L in the axial direction, when the spool 26L is moved in its axial direction relative to the sleeve 27L.

The sleeve 27L has several ports 30AL to 30FL. The port 30AL is an inlet port for introducing the hydraulic working pressure into the inside space of the sleeve 27L (the first oil chamber 29AL). The port 30AL is always in communication to the first oil chamber 29AL. The port 30BL is another inlet port for introducing the clutch pressure (the hydraulic pressure of the friction element 2) into the inside space of the sleeve 27L (the second oil chamber 29BL). The port 30BL is always in communication to the second oil chamber 29BL. The port 30CL is a further inlet port for introducing the line pressure from the hydraulic pressure source 13 into the inside space of the sleeve 27L (the fourth oil chamber 29DL). The port 30CL is always in communication to the fourth oil chamber 29DL.

The port 30DL is a further inlet port for introducing the hydraulic control pressure outputted from the pressure control valve 8 into the inside space of the sleeve 27L (the third oil chamber 29CL). The port 30DL is operatively communicated to the third oil chamber 29CL by the second land 26BL. More exactly, when the spool 26L is moved in the left-hand direction (the first axial direction), the port 30DL is communicated to the third oil chamber 29CL, while the communication between the port 30DL and the third oil chamber 29CL is blocked off by the second land 26BL when the spool 26L is moved in the right-hand direction (the second axial direction).

The port 30EL is an outlet port for outputting the hydraulic pressure, which is introduced into the third oil chamber 29CL from the port 30DL, to the friction element 2. The port 30EL is always in communication to the third oil chamber 29CL.

The port 30FL is a further inlet port for introducing the line pressure outputted from the hydraulic pressure source 13 into the inside space of the sleeve 27L (the third oil chamber 29CL). The port 30FL is operatively communicated to the third oil chamber 29CL by the third land 26CL. More exactly, when the spool 26L is moved in the right-hand direction (the second axial direction), the port 30FL is communicated to the third oil chamber 29CL, while the communication between the port 30FL and the third oil chamber 29CL is blocked off by the third land 26CL when the spool 26L is moved in the left-hand direction (the first axial direction).

The spring 28L is provided in the first oil chamber 29AL for biasing the spool 26L in the right-hand direction (the second axial direction).

In the above passage switching valve 24L of the second type, an axial end surface of the first land 26AL (a left-hand side surface) functions as a first pressure receiving portion 31AL for receiving the hydraulic working pressure of the working oil from the working-pressure output valve 25. An axial end surface of the second land 26BL (a left-hand side surface) functions as a second pressure receiving portion 31BL for receiving the clutch pressure from the friction element 2. More exactly, a surface area portion of the left-hand side axial end surface of the second land 26BL, which is larger than a surface area of a right-hand side axial end surface of the first land 26AL, works as the second pressure receiving portion 31BL. An axial end surface of the third land 26CL (a right-hand side surface) functions as a third pressure receiving portion 31CL for receiving the line pressure from the hydraulic pressure source 13.

A direction of the hydraulic working pressure at the first pressure receiving portion 31AL as well as a direction of the clutch pressure at the second pressure receiving portion 31BL is opposite to a direction of the line pressure at the third pressure receiving portion 31CL. A surface area of the first pressure receiving portion 31AL is smaller than that of the third pressure receiving portion 31CL. The spring 28L biases the spool 26L in the second axial direction (in the right-hand direction), which is opposite to the direction of the line pressure at the third pressure receiving portion 31CL.

When a sum of an acting force of the hydraulic working pressure at the first pressure receiving portion 31AL and an acting force of the clutch pressure at the second pressure receiving portion 31BL becomes equal to or larger than an acting force of the line pressure at the third pressure receiving portion 31CL, the communication condition of the passage switching valve 24L of the second type is changed by a spring force of the spring 28L from the first communication state (FIG. 7) to the third communication state (FIG. 8).

Figure 9:
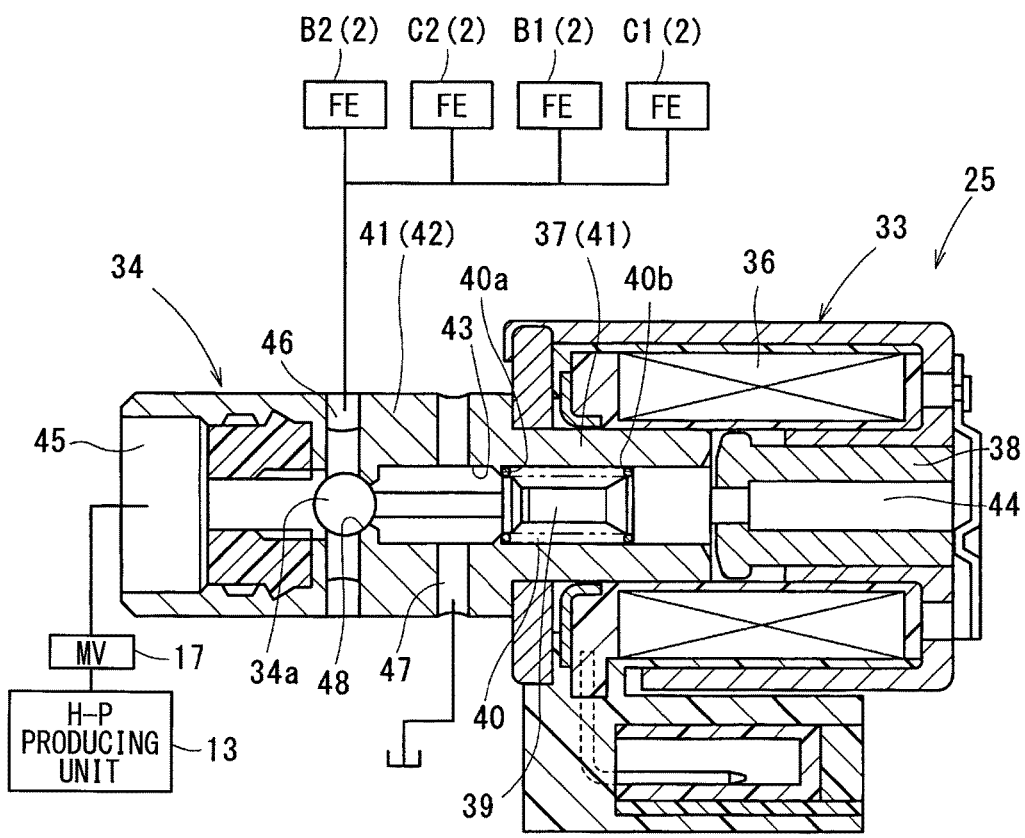
FIG. 9 is a schematic cross sectional view showing a structure of a hydraulic-pressure output unit.

As explained below with reference to FIG. 9, the working-pressure output valve 25 has a solenoid 33 electrically operated by the ECU 3 and a valve portion 34 for selecting one of the line pressure and the drain pressure depending on a power supply condition to the solenoid 33 and outputting such a selected pressure (as the hydraulic working pressure) to the passage switching valves 24H and 24L, as shown in FIGS. 1 and 5 to 8.

When the electric power is supplied to the solenoid 33, the drain pressure is selected by the working-pressure output valve 25 and supplied to the first oil chamber 29AH of the passage switching valve 24H of the first type and the first oil chamber 29AL of the passage switching valves 24L of the second type, while the communication between the hydraulic pressure source 13 and each of the first oil chambers 29AH and 29AL of the passage switching valves 24H and 24L is blocked off by the working-pressure output valve 25. In other words, the working-pressure output valve 25 outputs the drain pressure as the hydraulic working pressure.

When the electric power supply to the solenoid 33 is cut off, the working-pressure output valve 25 blocks off the communication between the first oil chambers 29AH and 29L of the passage switching valves 24H and 24L and the drain side and selects the line pressure from the hydraulic pressure source 13 in order to supply the line pressure to the passage switching valves 24H and 24L as the hydraulic working pressure.

Hereinafter, the solenoid 33 and the valve portion 34 of the working-pressure output valve 25 are respectively referred to as a second solenoid 33 and a second valve portion 34.

The working-pressure output valve 25 will be further explained with reference to FIG. 9. The second solenoid 33 is composed of a coil 36, a fixed core 37, a movable core 38, a rod 39 and a spring 40. The fixed core 37 and the movable core 38 are arranged inside of the coil 36 in order that magnetic flux generated by the coil 36 passes through the fixed core 37 and the movable core 38. The rod 39 is movably arranged inside of the fixed core 37 and pushed in an axial direction of the fixed core 37 by the movable core 38, which is magnetically pulled in by the magnetic flux generated by the coil 36. The spring 40 biases the rod 39 and the movable core 38 in the axial direction opposite to a moving direction of the movable core 38. In the present embodiment, the moving direction of the movable core 38, which is moved by a magnetic attracting force of the coil 36 in a left-hand direction in FIG. 9, is referred to a first axial direction, while the moving direction of the movable core 38, which is moved by the spring 40 in a right-hand direction, is referred to as a second axial direction.

The fixed core 37 is formed as a part of a metal part 42, which is made of magnetic material and integrally formed with a housing 41 for the second valve portion 34. A through-hole 43 is formed in the metal part 42, wherein the through-hole 43 extends in the axial direction of the fixed core 37. The rod 39 is movably accommodated in the through-hole 43. The movable core 38 has a pushing member 44, which pushes the rod 39 in the first axial direction when the pushing member 44 is moved in the first axial direction and brought into contact with an axial end (a right-hand end) of the rod 39. The spring 40 is composed of a coil spring, which is arranged in the through-hole 43 between a first spring seat 40*a* of a left-hand side formed at an inner peripheral wall of the through-hole 43 and a second spring seat 40*b* formed at a right-hand side axial end of the rod 39.

The second valve portion 34 is composed of the housing 41, which is the part of the metal part 42 and a ball-shaped valve member 34*a* movably accommodated in a fluid passage formed in the housing 41.

An inlet port 45, an outlet port 46 and a discharge port 47 are formed in the housing 41. The inlet port 45 is connected to the hydraulic pressure source 13 via the manual valve 17. The outlet port 46 is connected to each of the first oil chambers 29AH and 29AL of the passage switching valves 24H and 24L. The discharge port 47 is connected to the drain side. Each of the three ports 45, 46 and 47 is communicated to the through-hole 43 to form fluid passages in the housing 41.

The valve member 34*a* is operatively seated on or separated from a valve seat 48 formed in the through-hole 43, in order to switch over an operating condition of the working-pressure output valve 25 from a first operating condition to a second operating condition, or vice versa.

In the first operating condition, in which the valve member 34*a* is separated from the valve seat 48, the hydraulic pressure is extracted from the first oil chambers 29AH and 29AL of the passage switching valves 24H and 24L to the drain side. In other words, the drain pressure is outputted from the working-pressure output valve 25 to the passage switching valves 24H and 24L.

In the second operating condition, in which the valve member 34*a* is seated on the valve seat 48, the hydraulic pressure from the hydraulic pressure source 13 is supplied to the first oil chambers 29AH and 29AL of the passage switching valves 24H and 24L. In other words, the line pressure is outputted from the working-pressure output valve 25 to the passage switching valves 24H and 24L.

More exactly, the valve seat 48 is formed at a position of the fluid passage between the outlet port 46 and the discharge port 47, while the outlet port 46 is always in communication with the inlet port 45. When the valve member 34*a* is separated from the valve seat 48, the discharge port 47 is communicated to the outlet port 46, so that the hydraulic pressure is extracted from the first oil chambers 29AH and 29AL of the passage switching valves 24H and 24L to the drain side. On the other hand, when the valve member 34*a* is seated on the valve seat 48, the communication between the discharge port 47 and the outlet port 46 is blocked off, while the communication between the inlet port 45 and the outlet port 46 is maintained, so that the line pressure is supplied to the first oil chambers 29AH and 29AL of the passage switching valves 24H and 24L.

As above, the working-pressure output valve 25 outputs the drain pressure as the hydraulic working pressure when the electric power is supplied to the second solenoid 33, while the working-pressure output valve 25 outputs the line pressure as the hydraulic working pressure when the electric power supply to the second solenoid 33 is cut off. Therefore, the working-pressure output valve 25 is a valve of the N/H type, which outputs the line pressure when no electric power is supplied to the second solenoid 33.

The ECU 3 electrically controls the working-pressure output valve 25 so as to change each of pressure receiving conditions at the first and the second pressure receiving portions 31AH and 31BH of the passage switching valve 24H of the first type, to thereby switch over the communication condition of the passage switching valve 24H from the first communication state to the second communication state, or vice versa. At the same time, the ECU 3 electrically controls the working-pressure output valve 25 so as to change each of pressure receiving conditions at the first and the second pressure receiving portions 31AL and 31BL of the passage switching valve 24L of the second type, to thereby switch over the communication condition of the passage switching valve 24L from the first communication state to the third communication state, or vice versa.

As shown in FIG. 4, the ECU 3 electrically controls the working-pressure output valve 25 when the friction element 2 is in its transient state (the gear-change operating condition), while the electric power supply to the working-pressure output valve 25 is cut off when the friction element 2 is in its steady state (the no-gear-change operating condition).

In addition, the electric power supply to the pressure control valve 8 is cut off by the ECU 3 after the hydraulic working pressure of the working-pressure output valve 25 has been changed to the line pressure, when the communication condition of the passage switching valve 24H of the first type is switched over from the first communication state to the second communication state and when the communication condition of the passage switching valve 24L of the second type is switched over from the first communication state to the third communication state.

In addition, the hydraulic working pressure of the working-pressure output valve 25 is changed to the drain pressure after the electric power supply has been started by the ECU 3 to the pressure control valve 8, when the communication condition of the passage switching valve 24H is switched over from the second communication state to the first communication state and when the communication condition of the passage switching valve 24L is switched over from the third communication state to the first communication state.

As shown in FIG. 1, an orifice 51 is provided in a working-oil supply line 50, which connects the working-pressure output valve 25 to the passage switching valves 24H and 24L. In addition, a bypass passage 52 is provided in the working-oil supply line 50 so as to bypass the orifice 51 and a check valve 53 is further provided in the bypass passage 52. The check valve 53 closes the bypass passage 52 and its closed condition is maintained when the electric power supply to the working-pressure output valve 25 is cut off (when the line pressure is outputted from the working-pressure output valve 25). On the other hand, the check valve 53 opens the bypass passage 52 when the electric power is supplied to the working-pressure output valve 25, so that the working oil is allowed to rapidly flow through the bypass passage 52 from the passage switching valves 24H and 24L to the working-pressure output valve 25.

As above, the check valve 53 allows the working oil to flow through the bypass passage 52 from the passage switching valves 24H and 24L to the working-pressure output valve 25, but prohibits the flow of the working oil from the working-pressure output valve 25 to the passage switching valves 24H and 24L. As a result, it is possible to quickly extract the working oil from the first oil chambers 29AH and 29AL when the electric power is supplied to the working-pressure output valve 25 so as to output the drain pressure, because the bypass passage 52 is opened by the check valve 53. On the other hand, it is possible to softly supply the hydraulic working pressure to the first oil chambers 29AH and 29AL when the electric power supply to the working-pressure output valve 25 is cut off, because the working oil is allowed to flow only through the orifice 51.

Hereinafter, operations of the passage switching valves 24H and 24L and the working-pressure output valve 25 will be further explained with reference to FIGS. 10 and 11. In particular, a pre-processing step for changing the operational condition of the friction element 2 from the steady state to the transient state as well as a post-processing step for changing the operational condition of the friction element 2 from the transient state to the steady state will be explained.

The pre-processing step is carried out during a short space of time when the steady state is changed to the transient state, while the post-processing step is likewise carried out in a short space of time when the transient state is changed to the steady state.

FIG. 10 is a time-series table showing a state transition from the steady state of the third gear position to the steady state of the fourth gear position of the automatic transmission apparatus via the transient state.

FIG. 11 is a time-series table showing a state transition from the steady state of the fourth gear position to the steady state of the third gear position via the transient state.

In FIGS. 10 and 11, "Lo" means the drain pressure or a low pressure corresponding to the drain pressure, while "Hi" means the line pressure or a high pressure corresponding to the line pressure. "YES" means that each of the passage switching valves 24H and 24L is in the communication state corresponding to one of the first to the third communication states. "NO" means that each of the passage switching valves 24H and 24L is not in the communication state corresponding to one of the first to the third communication states.

At first, the state transition from the steady state of the third gear position to the steady state of the fourth gear position will be explained with reference to FIG. 10.

In the steady state of the third gear position, no electric power is supplied to the working-pressure output valve 25, so that the hydraulic working pressure outputted from the working-pressure output valve 25 is the line pressure "Hi". In addition, since the electric power is supplied neither to the pressure control valve 8B1 (the N/L type) nor to the pressure control valve 8C1 (the N/H type), the hydraulic control pressure outputted from the pressure control valve 8B1 is the drain pressure "Lo" and the hydraulic control pressure outputted from the pressure control valve 8C1 is the line pressure "Hi". Since the passage switching valve 24L is in the first communication state (FIG. 7) and the friction element B1 is communicated to the pressure control valve 8B1, the clutch pressure of the friction element B1 is at the drain pressure "Lo". In addition, since the passage switching valve 24H is in the first communication state (FIG. 5) and the friction element C1 is communicated to the pressure control valve 8C1, the clutch pressure of the friction element C1 is at the line pressure "Hi".

When the gear-change demand for changing a gear position from the third gear position to the fourth gear position is generated, the pre-processing step is carried out. The ECU 3 starts the electric power supply to the working-pressure output valve 25 (at the timing "t0") in order that the hydraulic working pressure outputted from the working-pressure output valve 25 is changed from the line pressure to the drain pressure.

Then, the operational condition is moved to the transient state, so that the ECU 3 starts the electric power supply to the pressure control valves 8B1 and 8C1 (at a timing shortly after the timing "t0"). The clutch pressure of the friction element B1 as well as the hydraulic control pressure of the pressure control valve 8B1 is going to increase, while the clutch pressure of the friction element C1 as well as the hydraulic control pressure of the pressure control valve 8C1 is going to decrease. Thereafter, the clutch pressure of the friction element B1 is increased to a pressure corresponding to the line pressure (during a period from "t2c" to "t3a"), so that the friction plates 4a and 4b of the friction element B1 are engaged with each other. In other words, the friction element B1 is moved to its engaged condition. On the other hand, the clutch pressure of the friction element C1 is decreased to a pressure corresponding to the drain pressure (at the timing "t3"), so that the friction plates 4a and 4b of the friction element C1 are released from the engaged condition (that is, moved to the dis-engaged condition).

Thereafter, the operational condition is further moved to the post-processing step. In the post-processing step, the ECU 3 stops the electric power supply to the working-pressure output valve 25 (at the timing "t3a") in order that the hydraulic working pressure is changed from the drain pressure "Lo" to the line pressure "Hi".

The communication condition of the passage switching valve 24L is changed from the first communication state to the third communication state (FIG. 8), so that the friction element B1 directly receives the supply of the working oil of the line pressure from the hydraulic pressure source 13.

The communication condition of the passage switching valve 24H is changed from the first communication state to the second communication state (FIG. 6), so that the friction element C1 is directly connected to the drain side and the drain pressure is maintained in the friction element C1.

The ECU 3 stops the electric power supply to the pressure control valves 8B1 and 8C1 (at a timing after "t4").

Thereafter, in the steady state of the fourth gear position, the ECU 3 maintains the respective operational conditions of the working-pressure output valve 25, the pressure control valves 8B1 and 8C1 and the passage switching valves 24H and 24L, each of which corresponds to a condition at the end of the post-processing step.

The state transition from the steady state of the fourth gear position to the steady state of the third gear position will be explained with reference to FIG. 11.

In the steady state of the fourth gear position, no electric power is supplied to the working-pressure output valve 25, so that the hydraulic working pressure outputted from the working-pressure output valve 25 is the line pressure "Hi". In addition, since the electric power is supplied neither to the pressure control valve 8B1 (the N/L type) nor to the pressure control valve 8C1 (the N/H type), the hydraulic control pressure outputted from the pressure control valve 8B1 is the drain pressure "Lo" and the hydraulic control pressure outputted from the pressure control valve 8C1 is the line pressure "Hi". The passage switching valve 24L of the second type is in the third communication state (FIG. 8), the communication between the friction element B1 and the pressure control valve 8B1 is blocked off, and the friction element B1 receives the line pressure "Hi" directly from the hydraulic pressure source 13. In addition, since the passage switching valve 24H of the first type is in the second communication state (FIG. 6) and the communication between the friction element C1 and the pressure control valve 8C1 is blocked off, the friction element C1 is directly connected to the drain side so that the drain pressure "Lo" is maintained in the friction element C1.

When the gear-change demand for changing the gear position from the fourth gear position to the third gear position is generated, a pre-processing step is carried out. At first, the ECU 3 starts the electric power supply to the pressure control valves 8B1 (the N/L type) and 8C1 (the N/H type), in order to temporarily increase the hydraulic control pressure of the pressure control valve 8B1 to the high pressure "Hi" corresponding to the line pressure and temporarily decrease the hydraulic control pressure of the pressure control valve 8C1 to the low pressure "Lo" corresponding to the drain pressure. Thereafter, the ECU 3 starts the electric power supply to the working-pressure output valve 25 in order that the hydraulic working pressure outputted from the working-pressure output valve 25 is changed to the drain pressure "Lo".

As a result, the communication condition of the passage switching valve 24L is changed from the third communication state to the first communication state (FIG. 7), so that the friction element B1 is connected to the pressure control valve 8B1. On the other hand, the communication condition of the passage switching valve 24H is changed from the second communication state to the first communication state (FIG. 5), so that the friction element C1 is connected to the pressure control valve 8C1.

Then, the operational condition is moved to the transient state, so that the ECU 3 stops the electric power supply to the pressure control valves 8B1 and 8C1. Then, the clutch pressure as well as the hydraulic control pressure of the pressure control valve 8B1 is going to decrease, while the clutch pressure as well as the hydraulic control pressure of the pressure control valve 801 is going to increase. The clutch pressure of the friction element B1 is decreased to a pressure corresponding to the drain pressure "Lo" and the friction element B1 is changed from the engaged condition to the dis-engaged condition. On the other hand, the clutch pressure of the friction element C1 is increased to a pressure corresponding to the line pressure "Hi", so that the friction element C1 is changed from the dis-engaged condition to the engaged condition.

The operational condition is thereafter moved to a post-processing step, in which the ECU stops the electric power supply to the working-pressure output valve 25 in order to increase the hydraulic working pressure to the line pressure "Hi".

In the steady state of the third gear position after the post-processing step, the ECU 3 maintains the respective operational conditions of the working-pressure output valve 25, the pressure control valves 8B1 and 8C1 and the passage switching valves 24H and 24L, each of which corresponds to a condition at the end of the post-processing step.

The operation of the hydraulic control device 1 will be further explained, when a power-supply accident occurs, for example, when the electric power supply to the working-pressure output valve 25 is stopped due to an accident. Explanation will be made by comparing the present embodiment having the orifice 51 with a case having no such orifice.

According to the present embodiment, the orifice 51 is provided in the working-oil supply line 50 of the hydraulic control device 1. As a result, it becomes possible to avoid a so-called "double engagement situation" or "neutral situation", even when the power-supply accident occurs during the gear-change operation in which the shift lever 18 is moved to one of the gear positions belonging to the D-range.

The explanation will be made for a virtual case, in which the power-supply accident occurs, for example, when the clutch pressure is being controlled in the transient state from the third gear position to the fourth gear position, in other words, when each of the passage switching valves 24H and 24L respectively connected to the friction elements C1 and B1 is in its first communication state.

In the above virtual case, the hydraulic working pressure outputted from the working-pressure output valve 25 is changed from the drain pressure to the line pressure due to the cut-off of the electric power supply to the working-pressure output valve 25 and thereby the pressure at the first pressure receiving portion 31AH/31AL is rapidly increased, if the orifice 51 was not provided in the working-oil supply line 50. As a result, the communication condition in the passage switching valves 24H and 24L would become unstable.

More exactly, when the power-supply accident occurs during the clutch pressure is being controlled, the communication condition of each passage switching valve 24H/24L is decided depending on a balance of forces respectively applied to the spool 26H/26L at the generation of the power-supply accident. In other words, it is decided depending on a value of the clutch pressure at the generation of the power-supply accident, which of the communication conditions (among the first, the second and the third communication states) is realized in each of the passage switching valves 24H and 24L.

For example, as shown in FIG. 5, in the passage switching valve 24H, the hydraulic working pressure pushes the first pressure receiving portion 31AH of the spool 26H in the second axial direction (in the right-hand direction), the clutch pressure pushes the second pressure receiving portion 31BH of the spool 26H in the first axial direction (in the left-hand direction). In addition, the spring 28H biases the spool 26H in the first axial direction. Therefore, in a case that the clutch pressure has been sufficiently increased to a high pressure, the spool 26H is not moved in the second axial direction (in the right-hand direction) even when the hydraulic working pressure at the first pressure receiving portion 31AH is rapidly increased due to the power-supply accident. As a result, the first communication state is maintained in the passage switching valve 24H of the first type. However, in a case that the clutch pressure has not yet been sufficiently increased to the high pressure, namely in the case that the clutch pressure is low, the spool 26H may be moved in the second axial direction. Then, the communication condition of the passage switching valve 24H is moved to the second communication state (FIG. 6).

Accordingly, the clutch pressure of the friction element C1 is fixed at the line pressure, which is a normal pressure of the pressure control valve 8C1, when the first communication state is maintained. On the other hand, the clutch pressure is fixed at the drain pressure, when the communication condition of the passage switching valve 24H is moved to the second communication state. As a result, it is uncertain whether the friction element C1 is changed to the engaged condition or the dis-engaged condition.

In the same manner to the passage switching valve 24H of the first type, it is uncertain in the passage switching valve 24L of the second type whether the first communication state is maintained or the communication condition is moved to the third communication state. Namely, it is uncertain whether the friction element B1 is changed to the engaged condition or the dis-engaged condition.

As above, if the power-supply accident occurs during the gear change operation from the third gear position to the fourth gear position, the "double engagement situation" or the "neutral situation" may occur. In the "double engagement situation", both of the friction elements B1 and C1 are changed to the engaged condition. On the other hand, in the "neutral situation", both of the friction elements B1 and C1 are changed to the dis-engaged condition.

In the present embodiment, however, the orifice 51 is provided in the working-oil supply line 50, in order that the pressure increase of the working oil is softly transmitted to the passage switching valves 24H and 24L, even if the power-supply accident occurs and the hydraulic working pressure is rapidly increased in the working-pressure output valve 25. More exactly, the working oil of the high pressure is prevented by the orifice 51 from rapidly flowing from the working-pressure output valve 25 into the first oil chamber 29AH/29AL of the passage switching valve 24H/24L.

Therefore, the acting force at the pressure receiving portion 31AH/31AL is gradually increased. As a result, each of the passage switching valves 24H and 24L maintains the first communication state, even if the power-supply accident may occur.

According to the present embodiment, therefore, it is possible to fix the clutch pressure of the friction element B1 at the drain pressure, which is the normal pressure of the passage switching valve 8B1, while it is possible to fix the clutch pressure of the friction element C1 at the line pressure, which is the normal pressure of the passage switching valve 8C1. As a result, it is possible to fix the friction element B1 to the dis-engaged condition and to fix the friction element C1 to the engaged condition.

As above, it is possible to avoid the "double engagement situation" or the "neutral situation", even if the power-supply accident occurs during the gear change operation is carried out from the third gear position to the fourth gear position.

Advantages of the Embodiment

According to the hydraulic control device 1 of the present embodiment, the passage switching valve 24H of the first type is provided in the oil supply line 9 connected to the pressure control valve 8 of the N/H type (that is, the pressure control valves 8C1 and 8C2). The passage switching valve 24H receives the hydraulic working pressure from the working-pressure output valve 25. The passage switching valve 24H changes its communication condition from the first communication state (in which the friction element 2 is connected to the pressure control valve 8) to the second communication state (in which the friction element 2 is connected to the drain side), or vice versa.

The working-pressure output valve 25, which is electrically controlled by the ECU 3, selects one of the line pressure and the drain pressure depending on the power supply condition to the second solenoid 33 of the working-pressure output valve 25 and outputs the selected hydraulic pressure (the line pressure or the drain pressure) to the passage switching valve 24H as the hydraulic working pressure.

The passage switching valve 24H has the first pressure receiving portion 31AH for receiving the hydraulic working pressure from the working-pressure output valve 25 and the second pressure receiving portion 31BH for receiving the clutch pressure from the friction element 2. The ECU 3 controls the electric power supply to the working-pressure output valve 25 and the pressure control valve 8 (8C1, 8C2) in order to change the pressure receiving conditions at the first and the second pressure receiving portions 31AH and 31BH. As a result, the first communication state is changed to the second communication state, or vice versa.

According to the above structure and operation, it is possible to reduce the electrical power consumption for the pressure control valve 8 (8C1, 8C2) of the N/H type, when the friction element 2 (C1, C2) is in the steady state.

More exactly, in the pressure control valve 8 (8C1, 8C2) of the N/H type, the communication condition of the passage switching valve 24H is changed to the second communication state by controlling the hydraulic working pressure outputted from the working-pressure output valve 25 and the hydraulic control pressure outputted from the pressure control valve 8 (8C1, 8C2), so that the drain pressure is supplied to the friction element 2 (C1, C2). Therefore, in the steady state of the friction element 2 (C1, C2) and the second communication state of the passage switching valve 24H, it is possible to maintain the clutch pressure at the low pressure without supplying the electric power to the pressure control valve 8 (8C1, 8C2).

In addition, when the communication condition of the passage switching valve 24H is changed to the first communication state, the line pressure is supplied to the friction element 2 (C1, C2). Therefore, in the steady state of the friction element 2 (C1, C2) and the first communication state of the passage switching valve 24H, it is possible to maintain the clutch pressure at the high pressure without supplying the electric power to the pressure control valve 8 (8C1, 8C2).

Accordingly, it is possible to reduce the electrical power consumption for the pressure control valve 8 (8C1, 8C2) of the N/H type, when the friction element 2 (C1, C2) is in the steady state independently whether the passage switching valve 24H is in the first communication state or in the second communication state.

The communication condition of the passage switching valve 24H is changed to the second communication state, when the acting force at the first pressure receiving portion 31AH by the hydraulic working pressure is larger than the acting force at the second pressure receiving portion 31BH by the clutch pressure.

Therefore, the friction element 2 (C1, C2) is communicated to the drain side when the hydraulic working pressure is high and the clutch pressure is low. Namely, the passage switching valve 24H outputs the drain pressure (the low pressure). As a result, it is possible to maintain the clutch pressure at the low pressure by making the hydraulic working pressure at the line pressure, without supplying the electric power to the pressure control valve (8C1, 8C2).

In addition, in the passage switching valve 24H, the pressure receiving direction at the first pressure receiving portion 31AH for receiving the hydraulic working pressure is opposite to the pressure receiving direction at the second pressure receiving portion 31BH for receiving the clutch pressure.

Therefore, it is possible to prevent the movement of the pool 26H and to maintain the first communication state of the passage switching valve 24H, even when the hydraulic working pressure is increased in the condition that the electric power is not supplied to the pressure control valve 8 (8C1, 8C2) and the passage switching valve 24H is in the first communication state.

In other words, when the electric power is not supplied to the pressure control valve 8 (8C1, 8C2) and the passage switching valve 24H is in the first communication state, the clutch pressure of the friction element 2 (C1, C2) is at the line pressure. Therefore, the second pressure receiving portion 31BH receives the line pressure (the high pressure). As a result, even when the hydraulic working pressure is increased and thereby the acting force at the first pressure receiving portion 31AH is increased, the movement of the spool 26H is prevented and the first communication state is maintained, because the acting force at the second pressure receiving portion 31BH is at the line pressure (the high pressure).

In addition, the passage switching valve 24H has the spring 28H, which biases the spool 26H in the first axial direction opposite to the pressure receiving direction at the first pressure receiving portion 31AH for receiving the hydraulic working pressure.

Therefore, it is possible to properly bias the spool 26H in the first axial direction, when the spool 26H is going to move in the first axial direction depending on the change of the hydraulic working pressure and/or the clutch pressure.

Furthermore, according to the hydraulic control device 1 of the present embodiment, the passage switching valve 24L of the second type is provided in the oil supply line 9 connected to the pressure control valve 8 of the N/L type (that is, the pressure control valves 8B1 and 8B2). The passage switching valve 24L receives the hydraulic working pressure from the working-pressure output valve 25. The passage switching valve 24L changes its communication condition from the first communication state (in which the friction element 2 is connected to the pressure control valve 8) to the third communication state (in which the friction element 2 is connected to the hydraulic pressure source 13), or vice versa.

The passage switching valve 24L has the first pressure receiving portion 31AL for receiving the hydraulic working pressure from the working-pressure output valve 25, the second pressure receiving portion 31BL for receiving the clutch pressure from the friction element 2 (B1, B2), and the third pressure receiving portion 31CL for receiving the line pressure from the hydraulic pressure source 13. The ECU 3 controls the electric power supply to the working-pressure output valve 25 and the pressure control valve 8 (8B1, 8B2) in order to change the pressure receiving conditions at the first and the second pressure receiving portions 31AL and 31BL. As a result, the first communication state is changed to the third communication state, or vice versa.

According to the above structure and operation, it is possible to reduce the electrical power consumption of the pressure control valve 8 of the N/L type, when the friction element 2 is in the steady state.

More exactly, in the pressure control valve 8 (8B1, 8B2) of the N/L type, the communication condition of the passage switching valve 24L is changed to the third communication state by controlling the hydraulic working pressure outputted from the working-pressure output valve 25 and the hydraulic control pressure outputted from the pressure control valve 8 (8B1, 8B2), so that the line pressure is supplied to the friction element 2 (B1, B2). Therefore, in the steady state of the friction element 2 (B1, B2) and the third communication state of the passage switching valve 24L, it is possible to maintain the clutch pressure at the high pressure without supplying the electric power to the pressure control valve 8 (8B1, 8B2).

In addition, when the communication condition of the passage switching valve 24L is changed to the first communication state, the drain pressure is supplied to the friction element 2 (B1, B2). Therefore, in the steady state of the friction element 2 (B1, B2) and the first communication state of the passage switching valve 24L, it is possible to maintain the clutch pressure at the low pressure without supplying the electric power to the pressure control valve 8 (8B1, 8B2).

Accordingly, it is possible to reduce the electrical power consumption for the pressure control valve 8 (8B1, 8B2) of the N/L type, when the friction element 2 is in the steady state independently whether the passage switching valve 24L is in the first communication state or in the third communication state.

The communication condition of the passage switching valve 24L is changed to the third communication state, when the sum of the acting force at the first pressure receiving portion 31AL by the hydraulic working pressure and the acting force at the second pressure receiving portion 31BL by the clutch pressure is equal to or larger than the acting force at the third pressure receiving portion 31CL by the line pressure.

Therefore, the friction element 2 (B1, B2) is communicated to the hydraulic pressure source 13 when the hydraulic working pressure is high and the clutch pressure is high. Namely, the passage switching valve 24L outputs the line pressure (the high pressure). As a result, it is possible to maintain the clutch pressure at the high pressure when the hydraulic working pressure is increased to the line pressure, without supplying the electric power to the pressure control valve 8 (831, 8B2).

In addition, in the passage switching valve 24L, the pressure receiving direction at the first pressure receiving portion 31AL for receiving the hydraulic working pressure as well as the pressure receiving direction at the second pressure receiving portion 31BL for receiving the clutch pressure is opposite to the pressure receiving direction at the third pressure receiving portion 31CL for receiving the line pressure. In addition, the pressure receiving area at the first pressure receiving portion 31AL is smaller than that at the third pressure receiving portion 31CL.

Therefore, it is possible to prevent the movement of the pool 26L and to maintain the first communication state of the passage switching valve 24L, even when the hydraulic working pressure is increased in the condition that the electric power is not supplied to the pressure control valve 8 (8B1, 8B2) and the passage switching valve 24L is in the first communication state.

In other words, when the electric power is not supplied to the pressure control valve 8 (8B1, 8B2) and the passage switching valve 24L is in the first communication state, the clutch pressure of the friction element 2 (B1, B2) is at the drain pressure. Therefore, the second pressure receiving portion 31BL receives the drain pressure (the low pressure). As a result, even when the hydraulic working pressure is increased and thereby the acting force at the first pressure receiving portion 31AL is increased, the movement of the spool 26L is prevented and the first communication state is maintained, because the pressure receiving area at the first pressure receiving portion 31AL is smaller than that at the third pressure receiving portion 31CL and because the acting force at the second pressure receiving portion 31BL is at the drain pressure (the low pressure).

In addition, the passage switching valve 24L has the spring 28L, which biases the spool 26L in the second axial direction opposite to the pressure receiving direction at the third pressure receiving portion 31CL for receiving the line pressure.

Therefore, it is possible to properly bias the spool 26L in the second axial direction, when the spool 26L is going to move in the second axial direction depending on the change of the hydraulic working pressure and/or the clutch pressure.

The electric power is supplied to the working-pressure output valve 25 when the friction element 2 (B1, B2) is in the transient state, while no electric power is supplied to the working-pressure output valve 25 when the friction element 2 (B1, B2) is in the steady state.

Accordingly, it is possible to reduce the electric power consumption for the working-pressure output valve 25. More exactly, a time rate for the steady state with respect to a total operation time of the engine is predominantly larger than that for the transient state. Therefore, it is possible to reduce the electric power consumption, when the electric power is supplied to the working-pressure output valve 25 in the transient state, while no electric power is supplied to the working-pressure output valve 25 in the steady state.

The orifice 51 is provided in the working-oil supply line 50.

Therefore, the increase of the hydraulic working pressure is absorbed by the orifice 51 and softly transmitted to the passage switching valves 24H and 24L, when the power-supply accident takes place and the hydraulic working pressure is increased due to the cut-off of the electric power supply to the working-pressure output valve 25. Therefore, the rapid increase of the hydraulic working pressure acting at the first pressure receiving portions 31AH and 31AL can be suppressed and thereby the first communication state is respectively maintained in the passage switching valves 24H and 24L. As a result, it is possible to fix the clutch pressure at the respective normal pressure of the passage switching valves 24H and 24L, when the power-supply accident takes place.

More exactly, it is possible to fix the clutch pressure of the friction element 2 (which is in the transient state) at the normal pressure of the respective pressure control valve 8, when the power-supply accident takes place. The normal pressure of the pressure control valve 8 depends on the type of the pressure control valve 8 (that is, the N/H type or the N/L type). Accordingly, it is possible to prevent the "double engagement situation" and the "the neutral situation".

The working-oil supply line 50 has the bypass passage 52 for bypassing the orifice 51, wherein the check valve 53 is provided in the bypass passage 52. The check valve 53 opens the bypass passage 52 when the electric power is supplied to the working-pressure output valve 25, so that the working oil is allowed to flow through the bypass passage 52 from the passage switching valves 24H and 24L to the working-pressure output valve 25. The check valve 53 closes the bypass passage 52 and its closed condition is maintained when the electric power supply to the working-pressure output valve 25 is cut off.

In the case that the orifice 51 is provided in the working-oil supply line 50, a response of the passage switching valves 24H and 24L may be decreased when the communication condition is changed from the steady state to the transient state based on the gear-change demand. Therefore, the bypass passage 52 bypassing the orifice 51 is provided and the check valve 53 is provided in the bypass passage 52.

According to the above structure, it is possible to realize without delay the flow of the working oil from the passage switching valves 24H and 24L to the working-pressure output valve 25 through the check valve 53, when the communication condition is changed from the steady state to the transient state. In other words, the communication condition can be changed without delay from the steady state to the transient state in the normal operation. It is thereby possible to avoid the "double engagement situation" and the "the neutral situation" in case of the power-supply accident.

In each of the passage switching valves 24H and 24L, the spool 26H or 26L works as the valve member. The first and the second pressure receiving portions 31AH and 31BH are formed in the spool 26H, while the first to the third pressure receiving portions 31AL, 31BL and 31CL are formed in the spool 26L.

When compared with a case, in which a poppet valve is used as the valve member for each of the passage switching valves 24H and 24L, a manufacturing cost can be reduced in the present embodiment.

The passage switching valves 24L of the second type are provided in the respective oil supply lines 9B1 and 9B2, while the passage switching valves 24H are provided in the respective oil supply lines 9C1 and 9C2. One working-pressure output valve 25 is connected to each of the passage switching valves 24L and 24H.

Accordingly, since a number of the working-pressure output valve 25 is reduced, the cost for the hydraulic control device is reduced.

Modifications

The present disclosure is not limited to the above embodiment, but can be modified in various manners without departing from a spirit of the present disclosure.

In the above embodiment, the present disclosure is applied to the transient state from the third gear position to the fourth gear position and the transient state from the fourth gear position to the third gear position. The present disclosure can be further applied to any other gear-change operations, for example, a transient state from a second gear position to the third gear position and a transient state from the third gear position to the second gear position.

In the above embodiment, the hydraulic working pressure is supplied from one working-pressure output valve 25 to all of the passage switching valves 24H and 24L. However, respective working-pressure output valve 25 may be provided for each of the passage switching valves 24H and 24L, so that the hydraulic working pressure is supplied from each of the working-pressure output valves 25 to the respective passage switching valves 24H and 24L.

In the above embodiment, the spool 26H/26L is provided in each of the passage switching valves 24H and 24L. However, a poppet valve may be provided in the passage switching valve 24H.

In the above embodiment, the working-pressure output valve 25 outputs the drain pressure when the friction element 2 is in the transient state. However, the working-pressure output valve 25 may be composed of an N/L type valve so as to output the line pressure (the high pressure) when the electric power is supplied to the working-pressure output valve 25 of the N/L type.

In the above embodiment, the hydraulic control device 1 is applied to the 4-speed automatic transmission apparatus. However, the present disclosure may be also applied to a 6-speed automatic transmission apparatus.

What is claimed is:

1. A hydraulic control device for an automatic transmission apparatus of a vehicle, which includes multiple friction elements; and a hydraulic-pressure producing unit configured to output a line pressure of a high pressure, which is higher than atmospheric pressure; the hydraulic control device being configured to adjust a hydraulic control pressure to be operatively supplied to each of the friction elements by use of the line pressure, wherein the hydraulic control pressure is adjusted at a value between the line pressure and a drain pressure which is equal to the atmospheric pressure, the hydraulic control device comprising:

multiple hydraulic-pressure control units provided for each of the friction elements, each of the hydraulic-pressure control units being electrically controlled based on a command value for the hydraulic control pressure in order to adjust the hydraulic control pressure in accordance with an electric power supply amount and to output the hydraulic control pressure, and each of the hydraulic-pressure control units is a normally-high type control unit, so that the line pressure of the hydraulic-pressure producing unit is outputted from the hydraulic-pressure control unit when no electric power is supplied to the hydraulic-pressure control unit;

multiple oil supply lines provided for each of the friction elements, each of the oil supply lines connecting each of the hydraulic-pressure control units to the respective friction element in order to supply the hydraulic control pressure outputted from the hydraulic-pressure control units to the respective friction element;

a passage switching unit provided in at least one of the oil supply lines, a communication condition of the passage switching unit being configured to change from a first communication state to a second communication state, or vice versa, wherein the passage switching unit has a first oil chamber and a second oil chamber, and wherein the friction element is communicated to the hydraulic-pressure control unit via the second oil chamber in the first communication state and the friction element is communicated to a drain port of the passage switching unit via the second oil chamber in the second communication state; and a hydraulic-pressure output unit configured to select one of the line pressure and the drain pressure depending on an electric power supply condition thereto and output a selected hydraulic pressure as a hydraulic working pressure to the first oil chamber of the passage switching unit, wherein the passage switching unit has a first pressure receiving portion in the first oil chamber, the first pressure receiving portion being configured to receive the hydraulic working pressure outputted from the hydraulic-pressure output unit and the passage switching unit has a second pressure receiving portion in the second oil chamber, the second pressure receiving portion being configured to receive a clutch pressure of the friction element, which is a hydraulic pressure in the friction element, wherein a pressure receiving direction of the hydraulic working pressure to be applied to the first pressure receiving portion of the first oil chamber and a pressure receiving direction of the clutch pressure to be applied to the second pressure receiving portion of the second oil chamber are opposed to each other in an axial direction of the passage switching unit, and wherein a pressure receiving condition at the first and the second pressure receiving portions is changed by controlling the electric power supply condition to the hydraulic-pressure output unit and/or the hydraulic-pressure control unit connected to the passage switching unit in order to change the communication condition of the passage switching unit from the first communication state to the second communication state, or vice versa.

2. The hydraulic control device according to claim 1, wherein
the first pressure receiving portion is mechanically coupled to the second pressure receiving portion, and
the communication condition of the passage switching unit is changed to the second communication state when an acting force by the hydraulic working pressure at the first pressure receiving portion is larger than an acting force by the clutch pressure at the second pressure receiving portion.

3. The hydraulic control device according to claim 1, wherein
the first pressure receiving portion is mechanically coupled to the second pressure receiving portion.

4. The hydraulic control device according to claim 1, wherein
the first pressure receiving portion is mechanically coupled to the second pressure receiving portion, and
the passage switching unit has a spring configured to bias the first and the second pressure receiving portions in a direction opposite to the pressure receiving direction at the first pressure receiving portion for the hydraulic working pressure.

5. The hydraulic control device according to claim 1, wherein
the hydraulic-pressure output unit is configured to be electrically operated in a transient state, in which a coupling condition of friction plates of the friction element is changed from an engaged condition to a dis-engaged condition, or vice versa, and
no electric current is supplied to the hydraulic-pressure output unit in a steady state, in which the engaged condition or the dis-engaged condition of the friction plates is maintained.

6. The hydraulic control device according to claim 5, wherein
the communication condition of the passage switching unit is in the first communication state when the friction element is in the transient state, and
an orifice is provided in a working-oil supply line, which connects the hydraulic-pressure output unit to the passage switching unit.

7. The hydraulic control device according to claim 6, wherein
the working-oil supply line has a bypass passage bypassing the orifice,
a check valve is provided in the bypass passage, and
the check valve closes the bypass passage when no electric current is supplied to the hydraulic-pressure output unit, while the bypass passage is opened by the check valve when an electric power is supplied to the hydraulic-pressure output unit, so that the working oil is allowed to flow through the bypass passage.

8. The hydraulic control device according to claim 1, wherein
the passage switching unit has a valve member of a spool type, and
the first and the second pressure receiving portions are formed in the valve member of the spool type.

9. The hydraulic control device according to claim 1, wherein
the passage switching unit is provided in each of the oil supply lines, and
the hydraulic-pressure output unit is configured to output the selected hydraulic pressure to each of the passage switching units.

10. The hydraulic control device according to claim 1, wherein the hydraulic-pressure output unit has a coil and is configured to select one of the line pressure and the drain pressure when an electromagnetic force is generated upon receiving an electric power supply, so that the selected hydraulic pressure is outputted as the hydraulic working pressure.

11. The hydraulic control device according to claim 1, wherein each of the hydraulic-pressure control units has a coil configured to generate an electromagnetic force, a magnitude of which is controlled by the electric power supply amount to the coil, in order to adjust the hydraulic pressure at the value between the line pressure and the drain pressure and to output the adjusted hydraulic pressure as the hydraulic control pressure.

12. The hydraulic control device according to claim 1, wherein the electric power supply to the hydraulic-pressure control unit is cut off after the hydraulic working pressure outputted from the hydraulic-pressure output unit is changed to the line pressure when the communication condition of the passage switching unit is changed from the first communication state to the second communication state.

13. The hydraulic control device according to claim 1, wherein the hydraulic working pressure to be outputted from the hydraulic-pressure output unit is changed to the drain pressure after the electric power supply to the hydraulic-pressure control unit has been started when the communication condition of the passage switching unit is changed from the second communication state to the first communication state.

14. A hydraulic control device for an automatic transmission apparatus of a vehicle, which includes multiple friction elements; and a hydraulic-pressure producing unit configured to output a line pressure of a high pressure, which is higher than atmospheric pressure;

the hydraulic control device being configured to adjust a hydraulic control pressure to be operatively supplied to each of the friction elements by use of the line pressure, wherein the hydraulic control pressure is adjusted at a value between the line pressure and a drain pressure, which is equal to the atmospheric pressure, the hydraulic control device comprising:

multiple hydraulic-pressure control units provided for each of the friction elements, each of the hydraulic-pressure control units being electrically controlled based on a command value for the hydraulic control pressure in order to adjust the hydraulic control pressure in accordance with an electric power supply amount and to output the hydraulic control pressure, and each of the hydraulic-pressure control units is a normally-low type control unit, so that the drain pressure is outputted from the hydraulic-pressure control unit when no electric power is supplied to the hydraulic-pressure control unit;

multiple oil supply lines provided for each of the friction elements, each of the oil supply lines connecting each of the hydraulic-pressure control units to the respective friction element in order to supply the hydraulic control pressure outputted from the hydraulic-pressure control unit to the respective friction element;

a passage switching unit provided in at least one of the oil supply lines, a communication condition of the passage switching unit being configured to change from a first communication state to a third communication state, or vice versa, wherein the passage switching unit has a first oil chamber, a second oil chamber and a third oil chamber, wherein the friction element is communicated to the hydraulic-pressure control unit via the third oil chamber in the first communication state and the friction element is communicated to the hydraulic-pressure producing unit via the third oil chamber in the third communication state; and a hydraulic-pressure output unit configured to select one of the line pressure and the drain pressure depending on an electric power supply condition thereto and output a selected hydraulic pressure as a hydraulic working pressure to the first oil chamber of the passage switching unit, wherein the passage switching unit has a first pressure receiving portion in the first oil chamber, the first pressure receiving portion being configured to receive the hydraulic working pressure outputted from the hydraulic-pressure output unit, the passage switching unit has a second pressure receiving portion in the second oil chamber, the second pressure receiving portion being configured to receive a clutch pressure of the friction element, which is a hydraulic pressure in the friction element, and the passage switching unit further has a third pressure receiving portion in the third oil chamber, the third pressure receiving portion being configured to receive the line pressure from the hydraulic-pressure producing unit, wherein a direction of the hydraulic working pressure to be applied to the first pressure receiving portion of the first oil chamber and a direction of the clutch pressure to be applied to the second pressure receiving portion are opposed to a direction of the line pressure to be applied to the third pressure receiving portion of the third oil chamber, and wherein a pressure receiving condition at the first and the second pressure receiving portions is changed by controlling the electric power supply condition to the hydraulic-pressure output unit and/or the hydraulic-pressure control unit connected to the passage switching unit in order to change the communication condition of the passage switching unit from the first communication state to the third communication state, or vice versa.

15. The hydraulic control device according to claim 14, wherein the first pressure receiving portion, the second pressure receiving portion and the third pressure receiving portion are mechanically coupled to one another, and the communication condition of the passage switching unit is changed to the third communication state when a sum of an acting force by the hydraulic working pressure at the first pressure receiving portion and an acting force by the clutch pressure at the second pressure receiving portion is equal to or larger than an acting force by the line pressure at the third pressure receiving portion.

16. The hydraulic control device according to claim 14, wherein the first pressure receiving portion, the second pressure receiving portion and the third pressure receiving portion are mechanically coupled to one another, and a pressure receiving area at the first pressure receiving portion is smaller than a pressure receiving area at the third pressure receiving portion.

17. The hydraulic control device according to claim 16, wherein
the passage switching unit has a spring configured to bias the first, the second and the third pressure receiving portions in a direction opposite to the pressure receiving direction at the third pressure receiving portion for the line pressure.

18. The hydraulic control device according to claim 14, wherein
the hydraulic-pressure output unit is configured to be electrically operated in a transient state, in which a coupling condition of friction plates of the friction element is changed from an engaged condition to a dis-engaged condition, or vice versa, and
no electric current is supplied to the hydraulic-pressure output unit in a steady state, in which the engaged condition or the dis-engaged condition of the friction plates is maintained.

19. The hydraulic control device according to claim 18, wherein
the communication condition of the passage switching unit is in the first communication state when the friction element is in the transient state, and
an orifice is provided in a working-oil supply line, which connects the hydraulic-pressure output unit to the passage switching unit.

20. The hydraulic control device according to claim 19, wherein
the working-oil supply line has a bypass passage bypassing the orifice,
a check valve is provided in the bypass passage, and
the check valve closes the bypass passage when no electric current is supplied to the hydraulic-pressure output unit, while the bypass passage is opened by the check valve when an electric power is supplied to the hydraulic-pressure output unit, so that the working oil is allowed to flow through the bypass passage.

21. The hydraulic control device according to claim 14, wherein
the passage switching unit has a valve member of a spool type, and
each of the first, the second and the third pressure receiving portions is formed in the valve member of the spool type.

22. The hydraulic control device according to claim 14, wherein
the passage switching unit is provided in each of the oil supply lines, and
the hydraulic-pressure output unit is configured to output the selected hydraulic pressure to each of the passage switching units.

23. The hydraulic control device according to claim 14, wherein
the hydraulic-pressure output unit has a coil and is configured to select one of the line pressure and the drain pressure when an electromagnetic force is generated upon receiving an electric power supply, so that the selected hydraulic pressure is outputted as the hydraulic working pressure.

24. The hydraulic control device according to claim 14, wherein
each of the hydraulic-pressure control units has a coil configured to generate an electromagnetic force, a magnitude of which is controlled by the electric power supply amount to the coil, in order to adjust the hydraulic pressure at the value between the line pressure and the drain pressure and to output the adjusted hydraulic pressure as the hydraulic control pressure.

25. The hydraulic control device according to claim 14, wherein
the electric power supply to the hydraulic-pressure control unit is cut off after the hydraulic working pressure outputted from the hydraulic-pressure output unit is changed to the line pressure when the communication condition of the passage switching unit is changed from the first communication state to the third communication state.

26. The hydraulic control device according to claim 14, wherein
the hydraulic working pressure to be outputted from the hydraulic-pressure output unit is changed to the drain pressure after the electric power supply to the hydraulic-pressure control unit has been started when the communication condition of the passage switching unit is changed from the third communication state to the first communication state.

* * * * *